(12) United States Patent
Amir et al.

(10) Patent No.: US 9,704,094 B2
(45) Date of Patent: Jul. 11, 2017

(54) MAPPING OF ALGORITHMS TO NEUROSYNAPTIC HARDWARE

(71) Applicant: INTERNATIONAL BUSINESS MACHINES CORPORATION, Armonk, NY (US)

(72) Inventors: Arnon Amir, Saratoga, CA (US); David J. Berg, Los Gatos, CA (US); Pallab Datta, San Jose, CA (US); Myron D. Flickner, San Jose, CA (US); Paul A. Merolla, Palo Alto, CA (US); Dharmendra S. Modha, San Jose, CA (US); Benjamin G. Shaw, San Francisco, CA (US); Brian S. Taba, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/626,677

(22) Filed: Feb. 19, 2015

(65) Prior Publication Data
US 2016/0247062 A1    Aug. 25, 2016

(51) Int. Cl.
*G06N 5/00* (2006.01)
*G06F 1/00* (2006.01)
*G06N 3/063* (2006.01)
*G06N 3/04* (2006.01)

(52) U.S. Cl.
CPC ............. *G06N 3/063* (2013.01); *G06N 3/049* (2013.01)

(58) Field of Classification Search
CPC ........... G06N 3/063; G06N 3/04; G06N 3/049
See application file for complete search history.

(56) References Cited

U.S. PATENT DOCUMENTS

| | | |
|---|---|---|
| 6,269,353 B1 | 7/2001 | Sethi et al. |
| 6,463,438 B1 | 10/2002 | Veltri |
| 6,622,135 B1 | 9/2003 | Imbert De Tremiolles et al. |
| 7,016,887 B2 | 3/2006 | Stockfisch |
| 7,089,592 B2 | 8/2006 | Adjaoute |
| 7,814,038 B1 | 10/2010 | Repici |
| 7,904,398 B1 | 3/2011 | Repici |
| 8,332,340 B2 | 12/2012 | Snider |
| 8,429,107 B2 | 4/2013 | Denneau et al. |

(Continued)

FOREIGN PATENT DOCUMENTS

WO    2013043610 A1    3/2013

OTHER PUBLICATIONS

Esser, S.K. et al., "Cognitive Computing Systems: Algorithms and Applications for Networks for Neurosynaptic Cores", 2013, pp. 1-10, IBM, United States.

(Continued)

*Primary Examiner* — Stanley K Hill
*Assistant Examiner* — Kalpana Bharadwaj
(74) *Attorney, Agent, or Firm* — Sherman IP LLP; Kenneth L. Sherman; Hemavathy Perumal

(57) ABSTRACT

One embodiment of the invention provides a method comprising defining a brainlet representing a platform-agnostic network of neurons, synapses, and axons. The method further comprises compiling the brainlet into a corelet for mapping onto neurosynaptic substrate, and mapping the corelet onto the neurosynaptic substrate. The corelet is compatible with one or more conditions related to the neurosynaptic substrate.

20 Claims, 24 Drawing Sheets

(56) References Cited

U.S. PATENT DOCUMENTS

| | | |
|---|---|---|
| 8,712,941 B2 | 4/2014 | Izhikevich et al. |
| 8,812,414 B2 | 8/2014 | Arthur et al. |
| 8,868,477 B2 | 10/2014 | Esser et al. |
| 8,909,576 B2 | 12/2014 | Akopyan et al. |
| 8,990,130 B2 | 3/2015 | Alvarez-Icaza Rivera |
| 8,996,430 B2 | 3/2015 | Modha |
| 9,020,867 B2 | 4/2015 | Esser |
| 9,165,242 B2 * | 10/2015 | Park ................. G06N 3/049 |
| 2011/0004579 A1 | 1/2011 | Snider |
| 2011/0106741 A1 | 5/2011 | Denneau et al. |
| 2012/0016829 A1 | 1/2012 | Snider |
| 2012/0084241 A1 | 4/2012 | Friedman et al. |
| 2012/0109864 A1 * | 5/2012 | Modha .................. G06N 3/063 706/25 |
| 2013/0031040 A1 | 1/2013 | Modha |
| 2013/0073484 A1 | 3/2013 | Izhikevich et al. |
| 2013/0073496 A1 | 3/2013 | Szatmary et al. |
| 2013/0218821 A1 | 8/2013 | Szatmary et al. |
| 2013/0232430 A1 | 9/2013 | Reitan |
| 2014/0019392 A1 | 1/2014 | Buibas |
| 2014/0052679 A1 | 2/2014 | Sinyavskiy et al. |
| 2014/0180987 A1 | 6/2014 | Arthur et al. |

OTHER PUBLICATIONS

IBM, "IBM creates new foundation to program SyNAPSE chips inspired by human brain", Phys. Org., Aug. 8, 2013, pp. 1-3, IBM, United States.

Booton, J., "After Watson, IBM Looks to Build 'Brain in a Box'", FOXBusiness, Aug. 22, 2013, pp. 1-2, United States.

Neuflow, "An embedded eye, in your hands", http://www.neuflow.org/, Feb. 6, 2012, p. 1-3, downloaded Feb. 13, 2015, United States.

Cassidy, A.S. et al, "Cognitive Computing Building Block: A Versatile and Efficient Digital Neuron Model for Neurosynaptic Cores", Proceedings of the 2013 Joint Conference on Neural Networks (IJCNN), Aug. 4-9, 2013, pp. 1-10, IEEE, United States.

Amir, A., et al., "Cognitive Computing Programming Paradigm: A Corelet Language for Composing Networks of Neurosynaptic Cores," in International Joint Conference on Neural Networks (IJCNN), 2013, p. 1-10, IEEE, United States.

Green, T.R.G. et al., "Usability Analysis of Visual Programming Environments: a 'cognitive dimensions' framework," Journal of Visual Languages and Computing, Jun. 1996, pp. 131-174, v. 7, issue 2, Elsevier, United States.

Nengo, "Nengo Neural Simulator", http://www.nengo.ca/, downloaded Feb. 13, 2015, p. 1-2, United States.

Arthur, J.V. et al., "Building Block of a Programmable Neuromorphic Substrate: A Digital Neurosynaptic Core", Proceedings of the 2012 World Congress on Computational Intelligence (WCCI), Jun. 10-15, 2012, IEEE, United States.

Brette, P. et al., "Simulation of networks of spiking neurons: A review of tools and strategies", J. of Computational Neuroscience, Apr. 12, 2007, pp. 1-50, Springer Science, United States.

Chakrabarti, D. et al., "Fully Automatic Cross-Associations", Proceedings of the 10th ACM SIGKDD International Conference on Knowledge discovery and data mining (KDD '04), Aug. 22, 2004, pp. 79-88, ACM, United States.

Corneil, D. et al., "Real-time inference in a VLSI spiking neural network", Proceedings of the 2012 International Symposium on Circuits and Systems (ISCAS), May 20-23, 2012, pp. 2425-2428, IEEE, United States.

Djurfeldt, M., "The Connection-set Algebra—A Novel Formalism for the Representation of Connectivity Structure in Neuronal Network Models", Neuroinformatics, Mar. 23, 2012, pp. 287-304, vol. 10, Issue 3, Springer, United States.

Ehrlich, M. et al., "A software framework for mapping neural networks to a wafer-scale neuromorphic hardware system", Proceedings of the 2010 Artificial Neural Networks and Intelligent Information Processing Conference, 2010, 1-10, United States.

Fox, G.C., et al., "Load Balancing by a Neural Network", Oct. 31, 1986, pp. 1-55, IP.com, United States.

Gleeson, P. et al., "NeuroML: A Language for Describing Data Driven Models of Neurons and Networks with a High Degree of Biological Detail", Jun. 17, 2010, PLOS Computational Biology, pp. 1-19, vol. 6, Issue 6, United States.

International Search Report and Written Opinion dated Oct. 8, 2014 for International Application No. PCT/EP2014/051215 from European Patent Office, pp. 1-15, Rijswijk, Netherlands.

Munipalli, S.K., "An FPGA implementation of a High Performance AER Packet Network", Jan. 1, 2013, Scholar Dissertations and Theses, pp. 1-105, Portland State University, PDXScholar, United States.

Preissl, R. et al., "Compass: A scalable simulator for an architecture for Cognitive Computing", Proceedings of the 2012 International Conference for High Performance Computing, Networking, Storage and Analysis (SC), Nov. 10-16, 2012, pp. 1-11, IEEE, United States.

Rodriguez A. et al., "Migrating Subarea Networks to an IP Infrastructure Using Enterprise Extender", IBM.com/Redbooks, Aug. 2000, pp. 1-276, IBM, United States.

Wendt, K. et al., GMPath—A Path Language for Navigation, Information Query and Modification of Data Graphs, Proceedings of the 2010 6th International Workshop Artificial Neural Networks and Intelligent Information Processing (ANNIP 2010), 2010, pp. 33-42, United States.

Zoeter, O., "A new approximate inference method for spike and slab model: expectation propagation with a replication trick", Mar. 27, 2012, pp. 1-13, IP.com, United States.

List of IBM Patents or Patent Applications Treated as Related Form; U.S. Appl. No. 14/662,096, filed Mar. 18, 2015; U.S. Appl. No. 14/669,575, filed Mar. 26, 2015; U.S. Appl. No. 14/528,885, filed Oct. 30, 2014; U.S. Appl. No. 13/791,505, filed Mar. 8, 2013; U.S. Appl. No. 14/662,115, filed Mar. 18, 2015.

International Search Report and Written Opinion dated Apr. 29, 2016 for International Application No. PCT/EP2016/051334 from European Patent Office, pp. 1-12, Rijswijk, Netherlands.

Plesser, H.E. et al., "Efficient Parallel Simulation of Large-Scale Neuronal Networks on Clusters of Multiprocessor Computers", Proceedings in the 13th International Euro-Par Conference, Lecture Notes in Computer Science, 28 Aug. 2007, pp. 672-681, vol. 4641, France.

Djurfeldt, M., "Efficient generation of connectivity in neuronal networks from simulator-independent descriptions", Frontiers in Neuroinformatics, Apr. 22, 2014, pp. 1-12, vol. 8, Article 43, United States.

Minkovich, K. et al., "Programming Time-Multiplexed Reconfigurable Hardware Using a Scalable Neuromporhic Compiler", Proceedings of the IEEE Transaction on Neural Networks and Learning Systems, Jun. 212, pp. 889-900, vol. 23, No. 6, United States.

Galluppi, F. et al., "A Hierachical Configuration System for a Massively Parallel Hardware Platform", Proceedings of the 9th Conference on Computing Frontiers (CF'12), May 15, 2012, pp. 183-192, United States.

Wendt, K. et al., "A graph theoretical approach for a multistep mapping software for the FACETS project", Proceedings of the 2nd WSEAS International Conference on Computer Engineering and Applications (CEA'08), Jan. 25, 2008, pp. 189-194, Mexico.

Eichner, H. et al., "Neural simulations on multi-core architectures", Frontiers in Neuroinformatics, Jul. 9, 2009, pp. 1-15, vol. 3, Article 21, United States.

Extended European Search Report dated Feb. 8, 2017 for European Application No. 16152389.9 from European Patent Office, pp. 1-13, Munich, Germany.

Liiv, L, "Seriation and Matrix Reordering Methods: An Historical Overview", Statistical Analysis and Data Mining, Mar. 11, 2010, pp. 70-91, vol. 3, No. 2, Wiley InterScience, United States.

List of IBM Patents or Applications Treated as Related.

* cited by examiner

120

101

| Input_0 | | Input_1 |
| RTTS[2][2] | | Rate[3] |

Script

```
Output_0 = rttsToRate(Input_0) + Input_1 if Input_1 > 4
    Output_1 = Input_0
else
    Output_1 = rateToRtts(Input_1)
```

121

| Output_0 | Output_1 |
| Rate[4] | RTTS[4] |

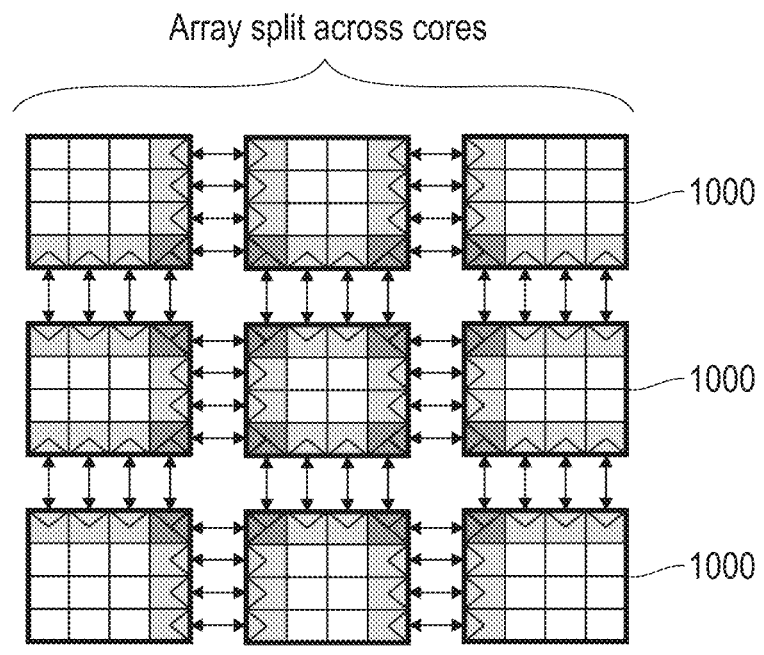

Array split across cores

Design 9 circuits:

- ☐ Tile circuit
- ▨ Tile circuit (1 neighbor on core above)
- ▨ Tile circuit (1 neighbor on core below)
- ▨ Tile circuit (1 neighbor on core to the left)
- ▨ Tile circuit (1 neighbor on core to the right)
- ▨ Tile circuit (2 neighbors on cores above and to the left)
- ▨ Tile circuit (2 neighbors on cores above and to the right)
- ▨ Tile circuit (2 neighbors on cores below and to the left)
- ▨ Tile circuit (2 neighbors on cores below and to the right)

FIG. 15

MAPPING OF ALGORITHMS TO NEUROSYNAPTIC HARDWARE

This invention was made with Government support under HR0011-09-C-0002 awarded by Defense Advanced Research Projects Agency (DARPA). The Government has certain rights in this invention.

BACKGROUND

The present invention relates to neuromorphic and neurosynaptic computation, and in particular, mapping of algorithms to neurosynaptic hardware.

Neuromorphic and neurosynaptic computation, also referred to as artificial neural networks, are computational systems that are inspired by biological brains. For example, neuromorphic and neurosynaptic computation may comprise various electronic circuits and/or create connections between processing elements that are inspired by neurons of a biological brain.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance may change with time as a function of the relative spike times of pre-synaptic and post-synaptic neurons.

BRIEF SUMMARY

One embodiment of the invention provides a method comprising defining a brainlet representing a platform-agnostic network of neurons, synapses, and axons. The method further comprises compiling the brainlet into a corelet for mapping onto neurosynaptic substrate, and mapping the corelet onto the neurosynaptic substrate. The corelet is compatible with one or more conditions related to the neurosynaptic substrate.

Another embodiment of the invention provides a system comprising a brainlet composer for defining a brainlet representing a platform-agnostic network of neurons, synapses, and axons. The system further comprises a corelet compiler for compiling the brainlet into a corelet for mapping onto a neurosynaptic substrate. The corelet is compatible with one or more conditions related to the neurosynaptic substrate.

These and other features, aspects, and advantages of the present invention will become understood with reference to the following description, appended claims, and accompanying figures.

BRIEF DESCRIPTION OF THE SEVERAL VIEWS OF THE DRAWINGS

FIG. 10 illustrates an example script node, in accordance with an embodiment of the invention;

FIG. 15 illustrates an example two-dimensional array of core circuits, in accordance with an embodiment of the invention;

DETAILED DESCRIPTION

Figure 1:
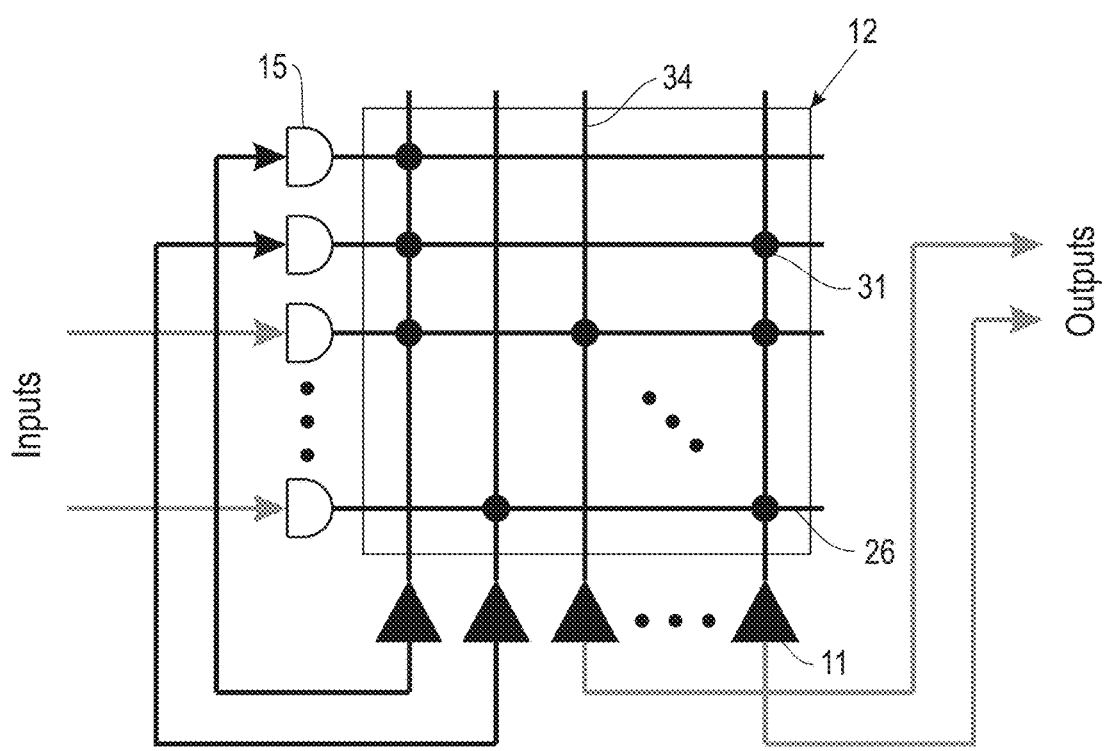
FIG. 1 illustrates an example neuromorphic core circuit, in accordance with an embodiment of the invention.

The present invention relates to neuromorphic and neurosynaptic computation, and in particular, mapping of algorithms to neurosynaptic hardware. One embodiment of the invention provides a method comprising defining a brainlet representing a platform-agnostic network of neurons, synapses, and axons. The method further comprises compiling the brainlet into a corelet for mapping onto neurosynaptic substrate, and mapping the corelet onto the neurosynaptic substrate. The corelet is compatible with one or more conditions related to the neurosynaptic substrate.

Another embodiment of the invention provides a system comprising a brainlet composer for defining a brainlet representing a platform-agnostic network of neurons, synapses, and axons. The system further comprises a corelet compiler for compiling the brainlet into a corelet for mapping onto a neurosynaptic substrate. The corelet is compatible with one or more conditions related to the neurosynaptic substrate.

In this specification, the terms neuromorphic and neurosynaptic are used interchangeably.

The term electronic neuron as used herein represents an architecture that creates connections between processing elements that are inspired by neurons of a biological brain. Although certain illustrative embodiments of the invention are described herein using electronic neurons comprising electronic circuits, the present invention is not limited to electronic circuits. A neuromorphic computation according to embodiments of the invention can be implemented as a neuromorphic and neurosynaptic architecture comprising circuitry, and additionally as a computer simulation. Indeed, embodiments of the invention can take the form of an entirely hardware embodiment, an entirely software embodiment or an embodiment containing both hardware and software elements.

The term neurosynaptic program as used herein represents a neurosynaptic network. A neurosynaptic program constitutes information relating to the following: neuronal properties and dynamics (e.g., a threshold parameter, a leak parameter, a delay parameter, a reset parameter, etc.) that determine an electronic neuron's response to input spikes, synaptic connections of the neuron (e.g., synaptic connections made via a synaptic crossbar), axon properties (e.g., axon types), and one or more destinations (e.g., target axons) that the neuron's output spike should be delivered to.

The term neurosynaptic network as used herein represents an instantiation of a neurosynaptic program. A neurosynaptic network may be instantiated in hardware, in simulation or both. For example, a neurosynaptic program may give rise to one or more instances of a neurosynaptic network, wherein the instances may reside on a single core, multiple cores, or multiple chips.

The term neuromorphic core circuit as used herein represents an example neurosynaptic network described by a neurosynaptic program.

The term brainlet as used herein represents a software abstraction that facilitates migration/mapping of an imperative program (e.g., an algorithm) to neurosynaptic hardware based on hardware-specific design rules. In this specification, the terms neurosynaptic hardware and neurosynaptic substrate are used interchangeably. Embodiments of the invention facilitate design and simulation of an algorithm on a simulation engine without having to emulate a neurosynaptic hardware during development of the algorithm. A brainlet allows for natural refinement of an algorithm from an abstract manifestation to a hardware-specific program.

The term corelet as used herein represents preferred embodiments of software that provide abstraction of neurosynaptic programs. A composition of neurosynaptic programs may be created by composing corelets.

FIG. 1 illustrates an example neuromorphic core circuit 10, in accordance with an embodiment of the invention. The core circuit 10 comprises a plurality of electronic neurons ("neurons") 11 and a plurality of electronic incoming axons ("axons") 15. The neurons 11 and the axons 15 are interconnected via an m×n crossbar 12 comprising multiple electronic synapse devices ("synapses") 31, wherein m and n are integers greater than or equal to one. The crossbar 12 further includes multiple rows/axon paths 26 and multiple columns/dendrite paths 34. Each axon 15 is connected to a corresponding axon path 26 of the crossbar 12. Each neuron 11 is connected to a corresponding dendrite path 34 of the crossbar 12. Each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each neuron 11 receives firing events (e.g., input spikes) via interconnected axons 15. Each neuron 11 has a corresponding neuronal state and a configurable set of neuronal properties and/or dynamics. Based on received firing events, its current neuronal state and its neuronal properties and dynamics, a neuron may generate a firing event (e.g., an output spike) according to a neuronal activation function. An example neuronal activation function may be leaky integrate-and-fire.

In this specification, let the term target destination denote a destination for a firing event. Each firing event has a corresponding target destination to which the firing event is delivered. Let the term target axon denote an axon 15 that is a target destination. A firing event generated by a neuron 11 propagates to a target axon 15, wherein the target axon 15 may reside in the core circuit 10 as the neuron 11 or in a different core circuit 10 included in a neuromorphic core-based architecture comprising multiple interconnected core circuits 10.

One or more axons 15 may receive external inputs, such as sensory inputs from one or more sensory transducers. In one embodiment, each sensor input is propagated to a target axon 15 as a firing event. One or more neurons 11 may generate firing events that are provided as external outputs, such as motor outputs provided to one or more end effectors or actuators. In one example implementation, an external two-way communication environment may supply sensory inputs to the core circuit 10 and consume motor outputs from the core circuit 10. In another embodiment, the external outputs represent signals provided to one or more software modules, visualizations or displays (e.g., signals indicating presence of particular classes in a field of view, or a particular pattern across a set of inputs).

The neurons 11 and axons 15 may be implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 may be implemented using one-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10 (e.g., a neuromorphic core-based architecture comprising multiple interconnected core circuits 10).

Figure 2:
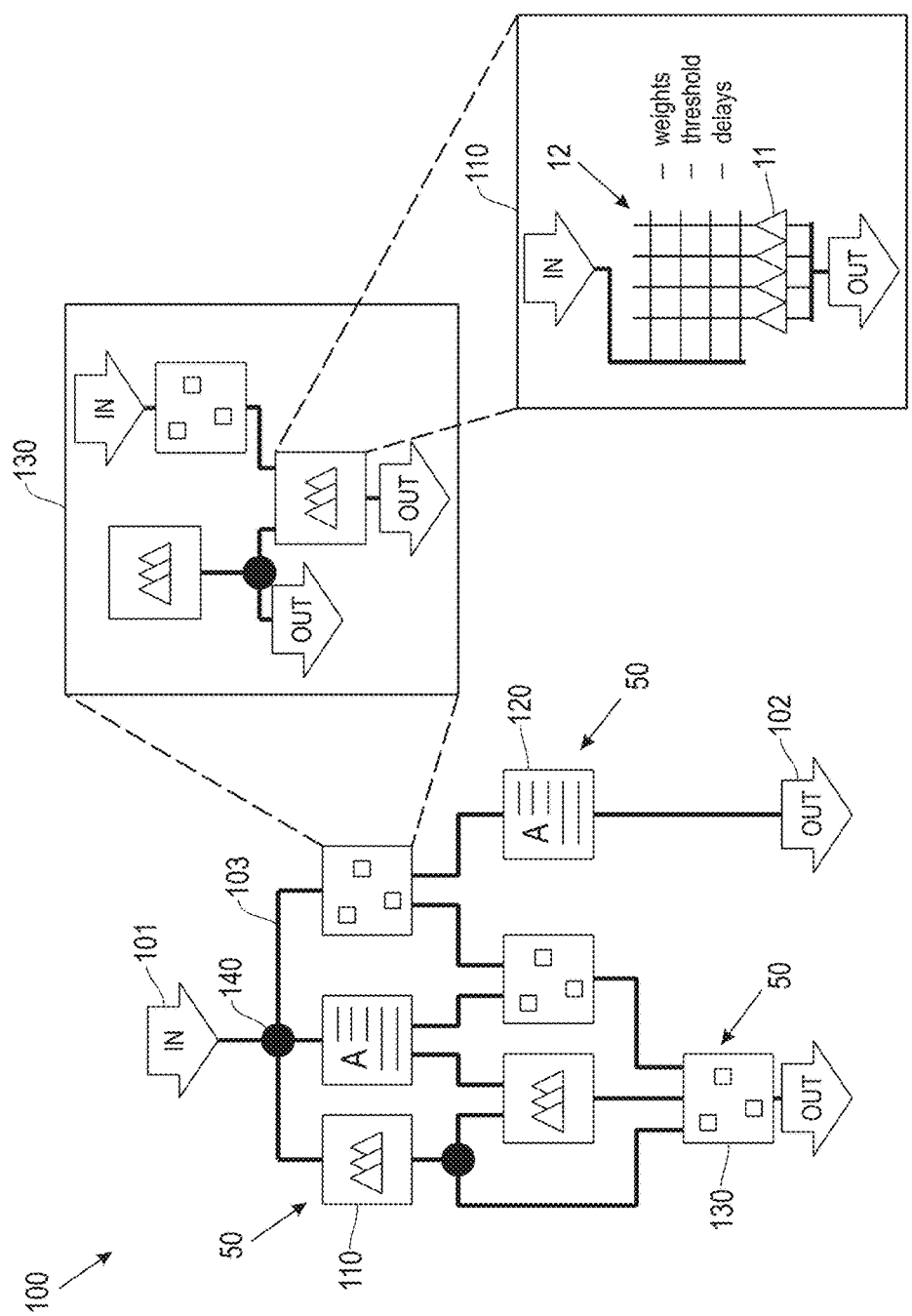
FIG. 2 illustrates an example brainlet, in accordance with an embodiment of the invention.

FIG. 2 illustrates an example brainlet 100, in accordance with an embodiment of the invention. A brainlet 100 may be represented as a dataflow graph that may be mapped to neurosynaptic hardware in part or in full. The brainlet 100 may comprise up to three different types of nodes 50: 1) a neuron node 110 comprising an N-dimensional array 12 of neurons 11, and 2) a script node 120 comprising imperative code 121 (FIG. 10) written in a scripting language (e.g., Python) to facilitate calling of neurons 11, and 3) a circuit node 130 comprising other nodes 50, thereby allowing nesting and encapsulation of subcircuits. Data (e.g., spikes) travel between the nodes 50 via point-to-point buses 103 of the brainlet 100. Data may enter and leave the brainlet 100 via one or more input ports 101 and one or more output ports 102, respectively.

As a brainlet 100 is statically assigned to one or more core circuits 10 at compile time (i.e., not dynamically scheduled during run time), the dataflow graph representing the brainlet 100 is a synchronous dataflow graph. Synchronous dataflow consistency may be validated at compile time using one or more static analysis methods.

Figure 3:
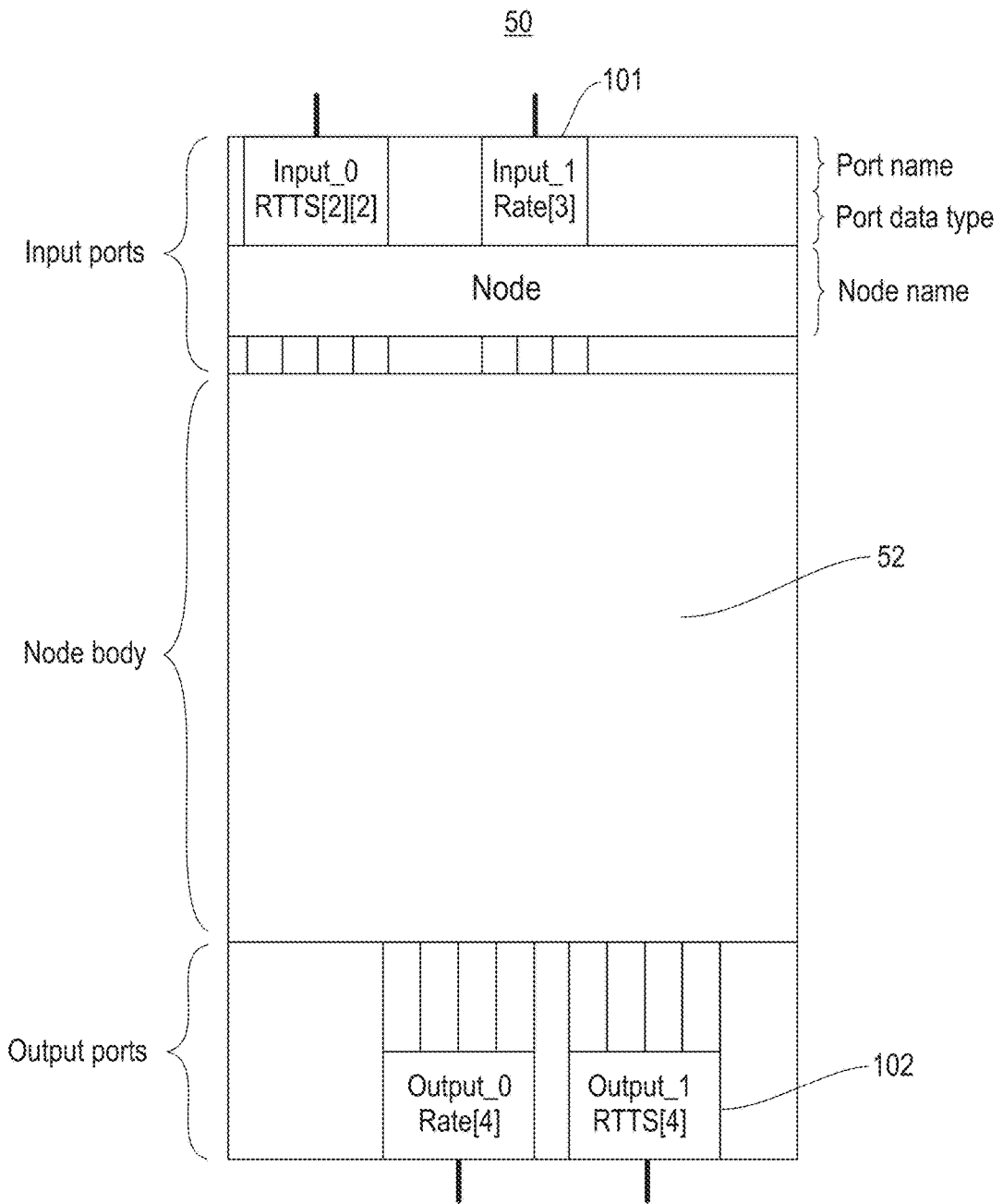
FIG. 3 illustrates an example node, in accordance with an embodiment of the invention.

FIG. 3 illustrates an example node 50, in accordance with an embodiment of the invention. Each node 50 is an opaque container including a set of input ports 101 and a set of output ports 102. Each node 50 has a corresponding node name identifying its node type (e.g., neuron node, script node, circuit node). Each node 50 further comprises a node body 52 including an internal implementation that is hidden from the rest of the brainlet 100.

Each port 101, 102 has a corresponding port data type and a corresponding port name. A port data type specifies a size and a data format of a corresponding port. When ports are wired together, corresponding port data types are checked to determine compatibility. If one port is wired to another port with a different but compatible port data type, a type-conversion node may be automatically inserted. If the port data types are incompatible instead, an error is raised.

A type-conversion node is either a neuron node 110 or a script node 120 that receives data via an input port of one data type, and relays that data via an output port of another, compatible data type. Neurons may be required to perform this conversion. For example, a rate-to-binary spike-code converter may receive the five spikes illustrated in FIG. 4A, and return a single spike indicating a binary yes-or-no presence of at least one spike during the 9-tick window illustrated in FIG. 4A.

In one embodiment, one data type may be cast directly to another data type. For example, the spike illustrated in FIGS. 4A-4C may be interpreted interchangeably, and no actual neurons are needed to perform a conversion.

In one embodiment, when converting between a spike-code data type and a non-spike data type (e.g. unsigned integer), a script node 120 is required to transduce data between spikes and non-spikes.

In one embodiment, script nodes 120 may use any data format permitted by a scripting language, such as an array of 32-bit unsigned integers, floating-point numbers, or character strings.

In one embodiment, a data format of a script node 120 may not be converted to spikes, so an error is raised if a port of a neuron node 110 is wired to a port of a script node 120 whose data format cannot be converted to spikes. A port of a spike-incompatible script node 120 may be wired to a port on another script node 120 or a circuit node 130.

Figure 4:
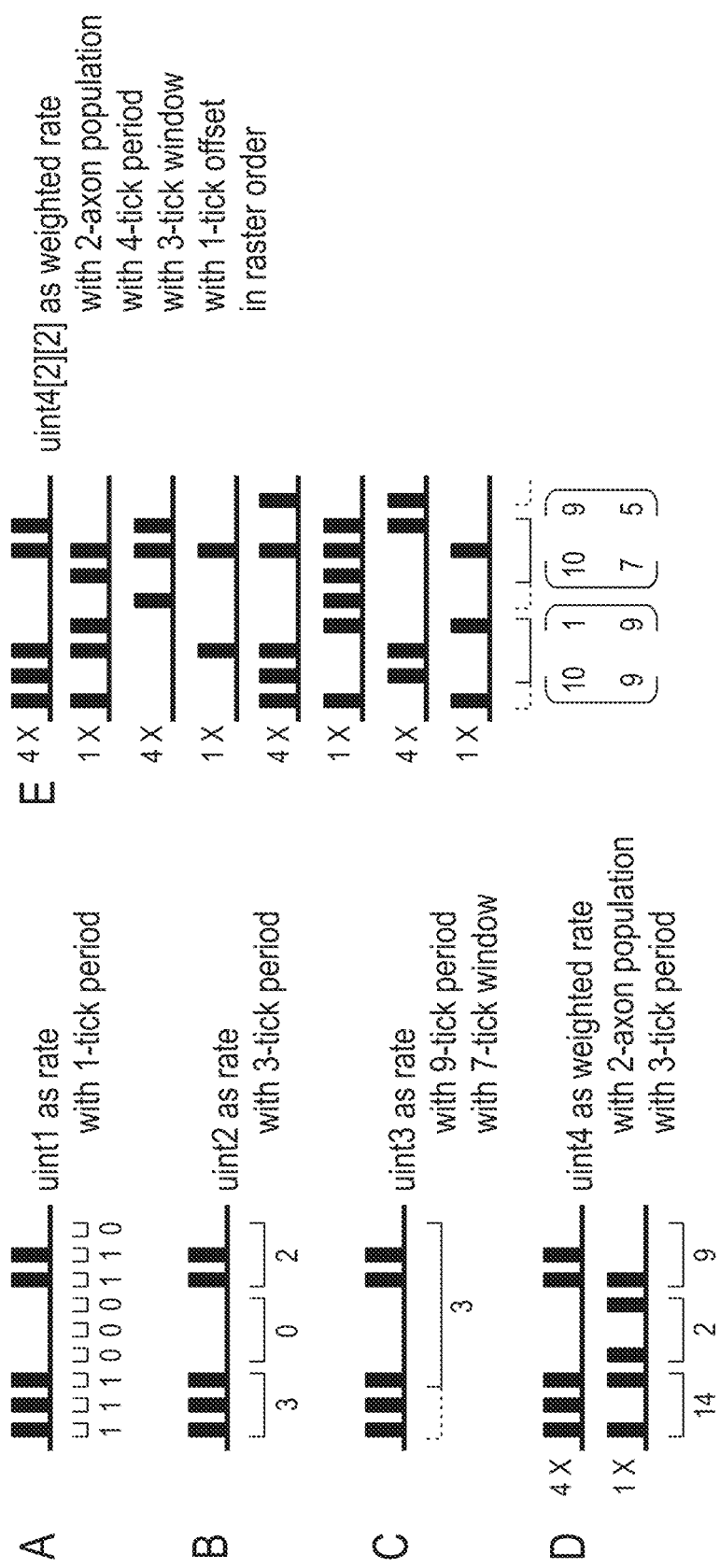
FIG. 4 illustrates different example data formats for ports, in accordance with an embodiment of the invention.

FIG. 4 illustrates different example data formats for ports, in accordance with an embodiment of an invention. The term token as used herein represents an instance of a port data type. Each port declares a corresponding port data type that defines how the port converts between spikes and tokens.

As shown in FIG. 4, there are different ways to represent a port data type as spikes, and vice versa. In a first example, a port may declare a token to be a 1-bit unsigned integer (i.e., every spike or absence of a spike is a binary-valued token), as illustrated by data format A. In a second example, a port may declare a token to be a 2-bit unsigned integer (i.e., sum all spikes in 3-tick bins to obtain values between 0 and 3), as illustrated by data format B. In a third example, a port may declare a token to be a 3-bit unsigned integer (i.e., sum all spikes in the first 7 ticks of a 9-tick bin to obtain values between 0 and 7), as illustrated by data format C. In a fourth example, a port may declare a token to be a 4-bit unsigned integer (i.e., sum all spikes in 3-tick bins on 2 axons, with a spike on the first axon weighted 4 times a spike on the second axon, to obtain values between 0 and 15), as illustrated by data format D. In a fifth example, a port may declare a token to be a two-dimensional array of 4-bit unsigned integers (i.e., each consecutive pair of axons is an array element listed in raster order), as illustrated by data format E.

Each port has a corresponding sample rate representing the number of tokens the port consumes or produces per tick. In one embodiment, to prevent tokens from piling up between nodes 50, two ports are connected only if both ports have the same sample rate (e.g., point-to-point buses 103 may be configured to verify that both ports have the sample rate).

In one embodiment, each node 50 must verify that sample rates of its input ports 101 are consistent with sample rates of its output ports 102. Consistency may be verified at compile time.

In one embodiment, ports may be connected even if the ports have different port data types. For example, an output port 102 that produces a stream of stochastically generated binary spikes may be connected to an input port 101 that utilizes a 7-tick data format to convert spikes into 3-bit unsigned integers.

Ports facilitate composition of brainlets by automatically casting spikes to appropriate port data types. For example, a node 50 may transmit the same train of spikes to three downstream nodes 50, such as a first downstream node 50 that interprets the spikes as a burst code that ignores spikes arriving outside a sampling window, a second downstream node 50 that interprets the spikes as individual binary events, and a third downstream node that interprets the spikes as a rate-coded integer.

Figure 5:
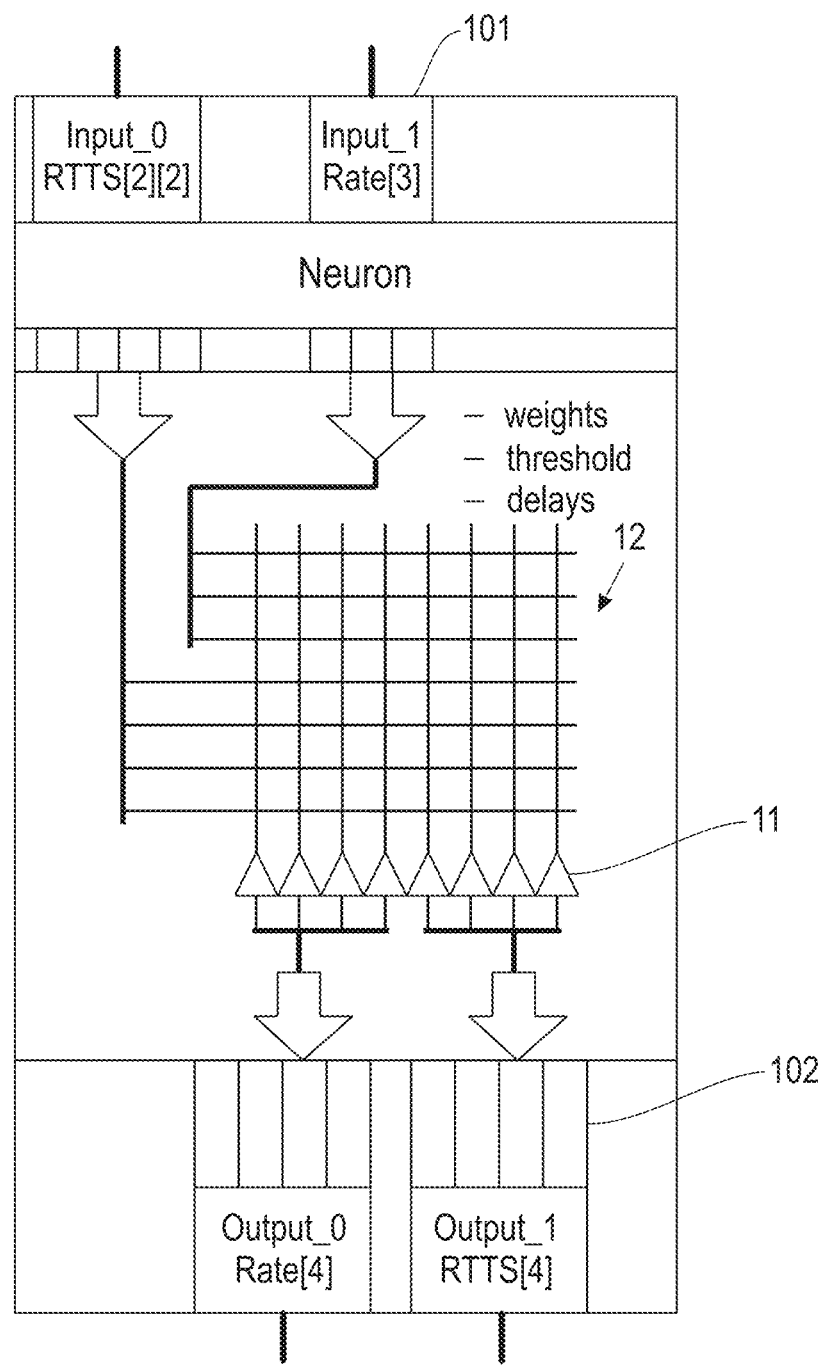
FIG. 5 illustrates an example neuron node, in accordance with an embodiment of the invention.
Figure 6:
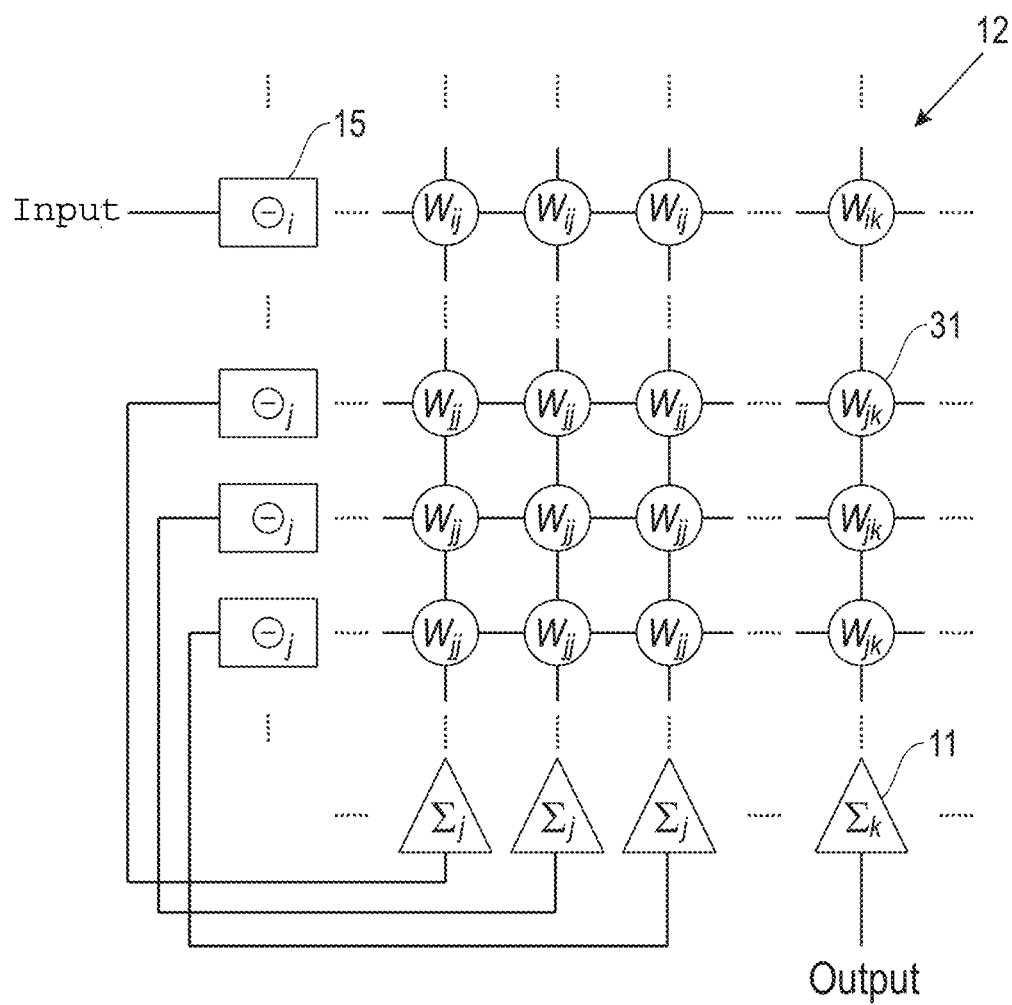
FIG. 6 illustrates an example N-dimensional array of neurons included in a neuron node, in accordance with an embodiment of the invention.

FIG. 5 illustrates an example neuron node 110, in accordance with an embodiment of the invention. FIG. 6 illustrates an example N-dimensional array 12 of neurons 11 included in a neuron node 110, in accordance with an embodiment of the invention. As stated above, a neuron node 110 comprises an N-dimensional array 12 of neurons 11. The neuron node 110 further includes a set of model parameters and an adjacency matrix specifying connectivity with other neurons 11. The set of model parameters may include one or more of the following: neuron parameters $\Sigma_j$ such as thresholds and leaks, axon parameters $\Theta_i$ such as delays, and weights $w_{ij}$ connecting axon i with neuron j.

Neuron nodes 110 strictly conform to all hardware-specific design rules, with specific exceptions that may be relaxed if desired. For example, weights $w_{ij}$ may allow arbitrary precision by relaxing a hardware-specific design rule of 4 axon types per core circuit 10.

The set of model parameters represents a rich instruction set for defining a wide range of spiking neural networks.

Figure 7:
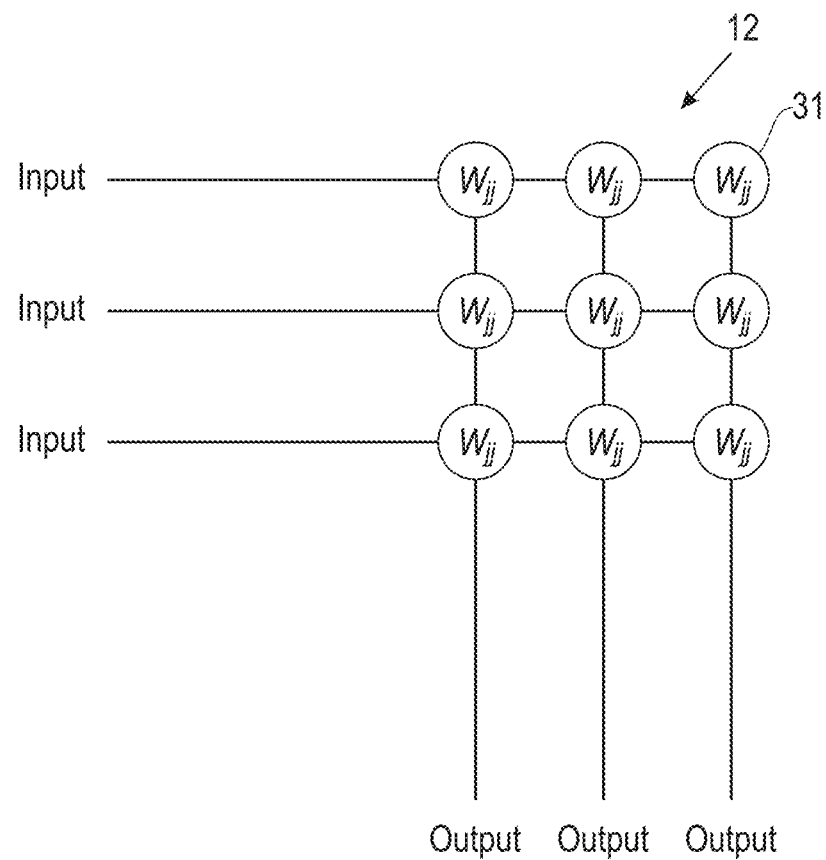
FIG. 7 illustrates an example subset of instructions for a neuron node, in accordance with an embodiment of the invention.
Figure 8:
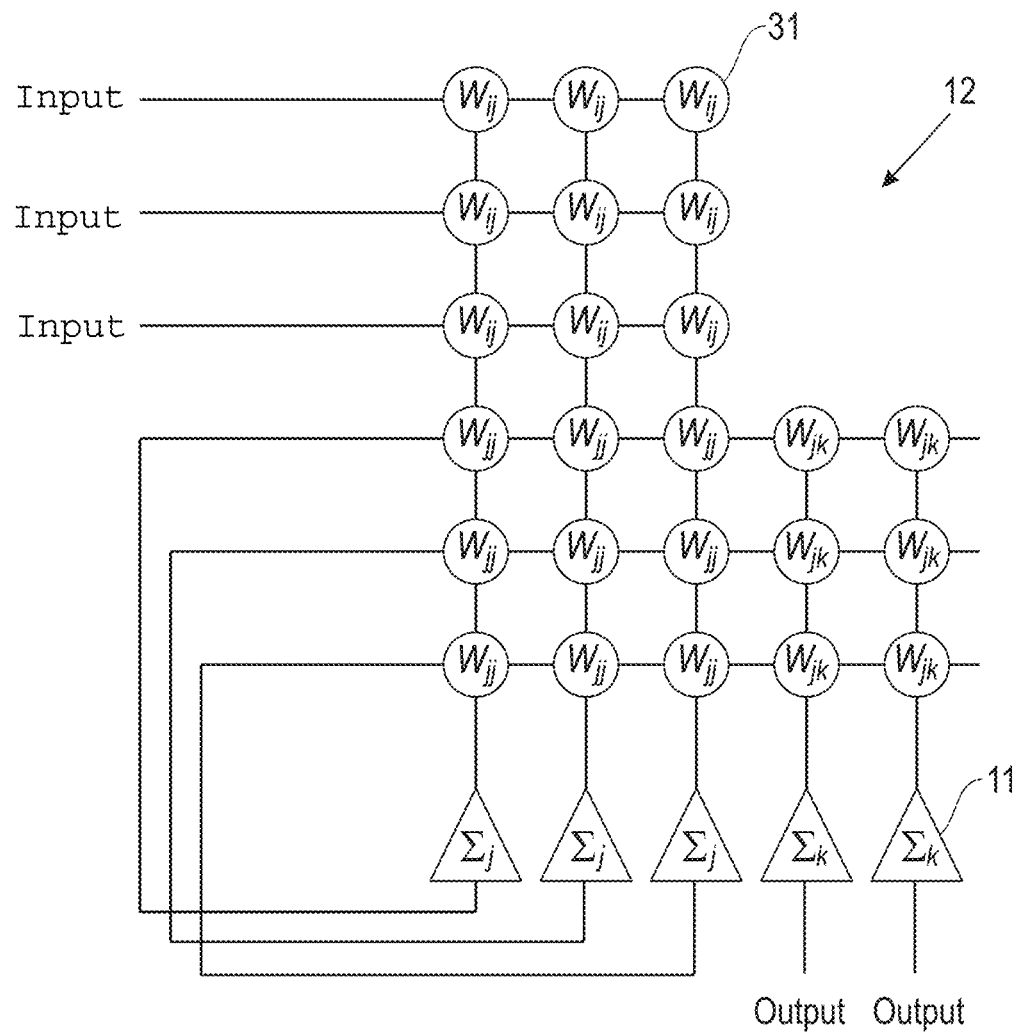
FIG. 8 illustrates another example subset of instructions for a neuron node, in accordance with an embodiment of the invention.
Figure 9:
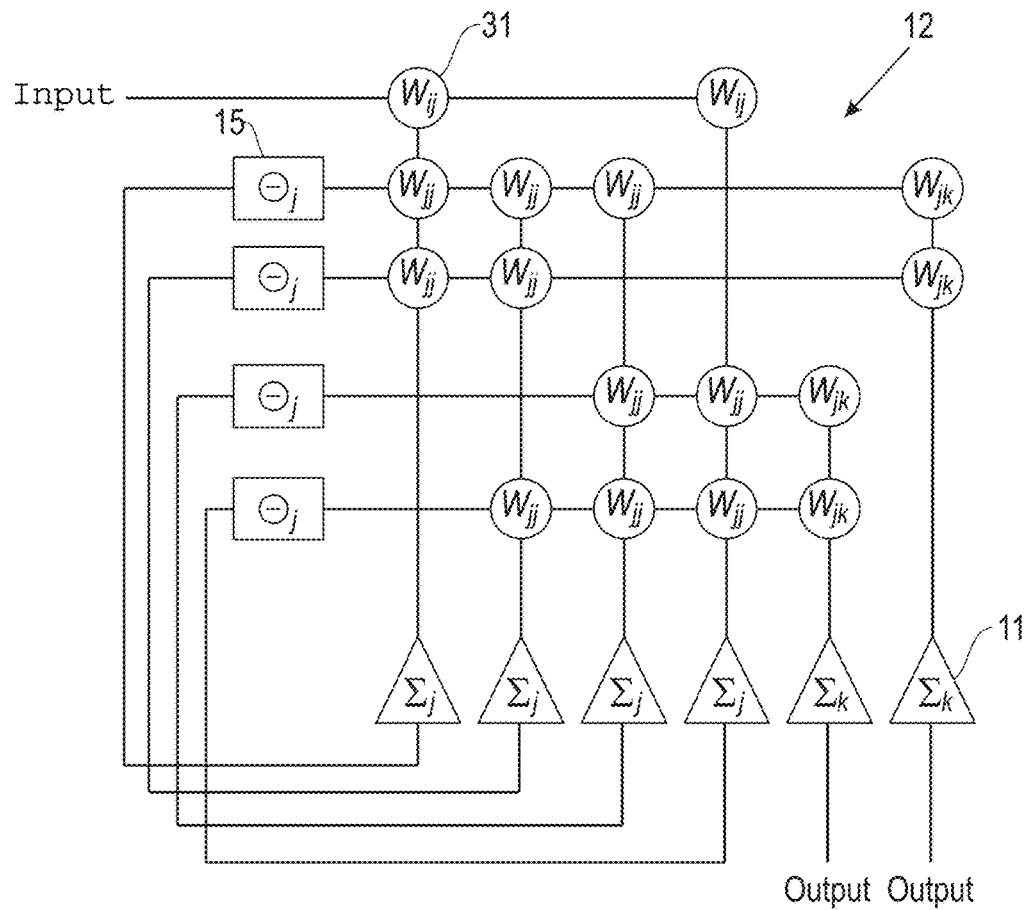
FIG. 9 illustrates another example subset of instructions for a neuron node, in accordance with an embodiment of the invention.

In another embodiment, non-spiking neural networks and non-neural networks, may be described using only a subset of instructions. For example, FIG. 7 illustrates an example subset of instructions for a neuron node 110, in accordance with an embodiment of the invention. A linear matrix multiplication shown in FIG. 7 uses only weights $w_{ij}$. FIG. 8 illustrates another example subset of instructions for a neuron node 110, in accordance with an embodiment of the invention. A non-linear matrix multiplication shown in FIG. 8 uses only weights $w_{ij}$ and thresholds $\Sigma_j$, and may define a non-spiking neural network. FIG. 9 illustrates another example subset of instructions for a neuron node 110, in accordance with an embodiment of the invention. A spiking bipedal gait generator shown in FIG. 9 utilizes a full set of model parameters, including weights $w_{ij}$, thresholds $\Sigma_j$, and delays $\Theta_i$.

In one embodiment, model parameters (e.g., model parameters for TrueNorth hardware) may appear only in neuron nodes 110 to future-proof a brainlet 100 against updates affecting the model parameters.

FIG. 10 illustrates an example script node 120, in accordance with an embodiment of the invention. Each script node 120 comprises arbitrary imperative code 121 written in a scripting language (e.g., Python) to facilitate calling of neurons 11, or to perform functions that neurons cannot implement efficiently or even at all.

In one embodiment, the code 121 need not be TrueNorth-compatible. Script nodes 120 allow a developer to combine TrueNorth compatible code with non-TrueNorth compatible code either as a placeholder to be ported into TrueNorth at a later time or as an interface with non-TrueNorth applications such as a unit-testing framework or a third-party API.

Figure 11:
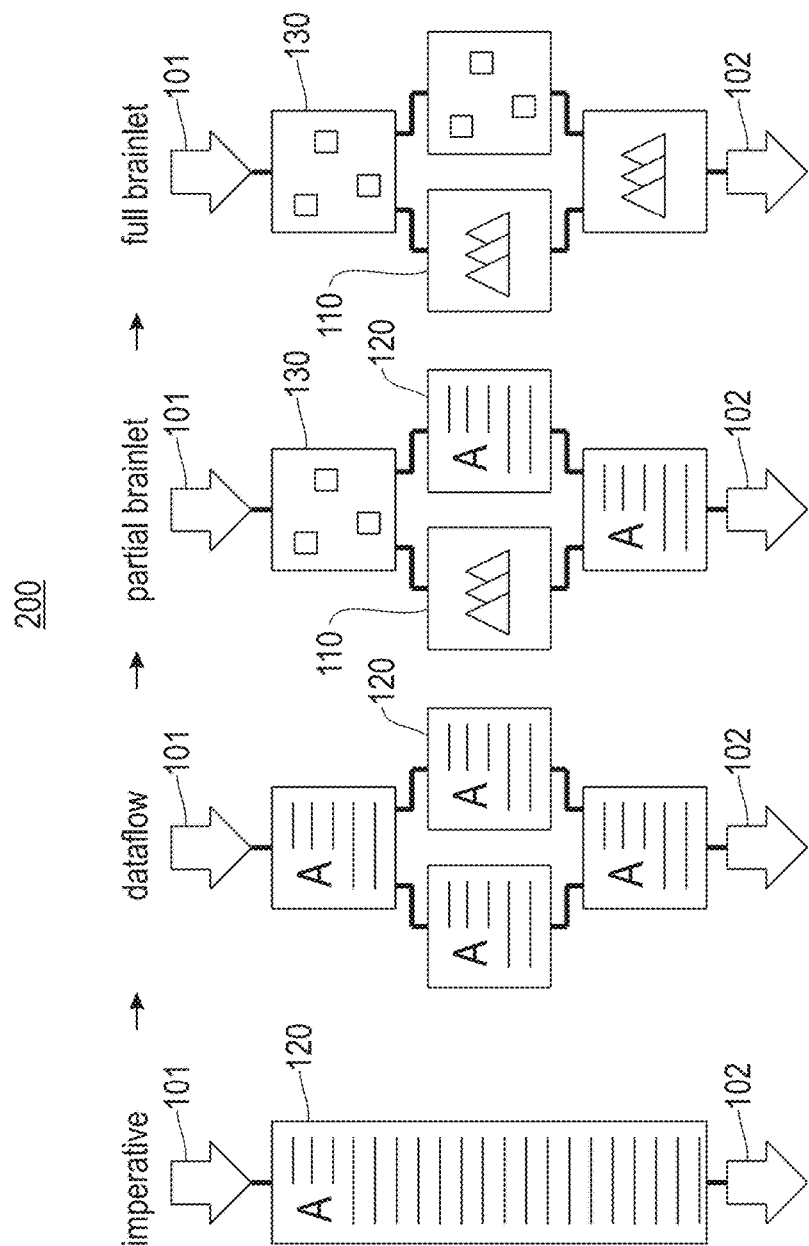
FIG. 11 illustrates an example design flow for a script node, in accordance with an embodiment of the invention.

FIG. 11 illustrates an example design flow 200 for a script node 120, in accordance with an embodiment of the invention. The ability to drop in arbitrary code in a script node 120 facilitates rapid prototyping of candidate node algorithms to determine whether the algorithms are worth porting into TrueNorth. As shown in FIG. 11, a developer may first write an imperative program to quickly evaluate a desired algorithm, refactor the program into a dataflow graph containing only script nodes 120, then replace each script node 120 with appropriate neuron nodes 110 or circuit nodes 130 to create a TrueNorth-compatible brainlet 100 that may be automatically compiled into a TrueNorth-compliant corelet.

Unlike a brainlet 100, a corelet 550 (FIG. 18) represents a dataflow graph that has already been fully mapped to hardware (e.g., TrueNorth hardware). Corelets 550 strictly conform to all hardware-specific design rules. A corelet 550 is used to implement an algorithm in a dataflow graph that conforms to all hardware-specific design rules/constraints and that directly maps to hardware. A brainlet 100 is used to map an algorithm to a corelet 550 without prematurely burdening a developer with hardware-specific design rules.

Figure 12:
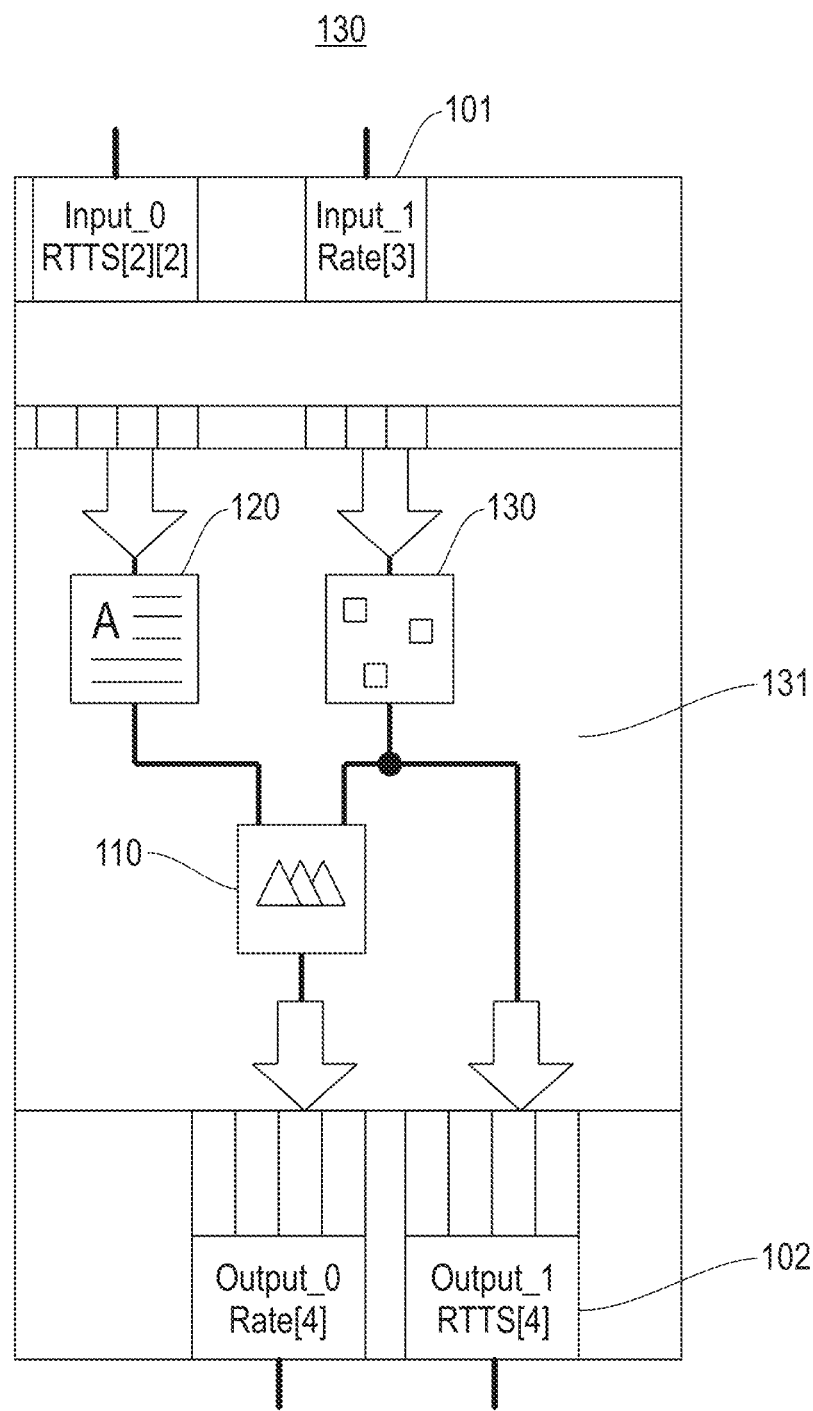
FIG. 12 illustrates an example circuit node, in accordance with an embodiment of the invention.

FIG. 12 illustrates an example circuit node 130, in accordance with an embodiment of the invention. A circuit node 130 is a container for other nodes 50. Circuit nodes 130 may be nested to arbitrary depth.

Figure 13:
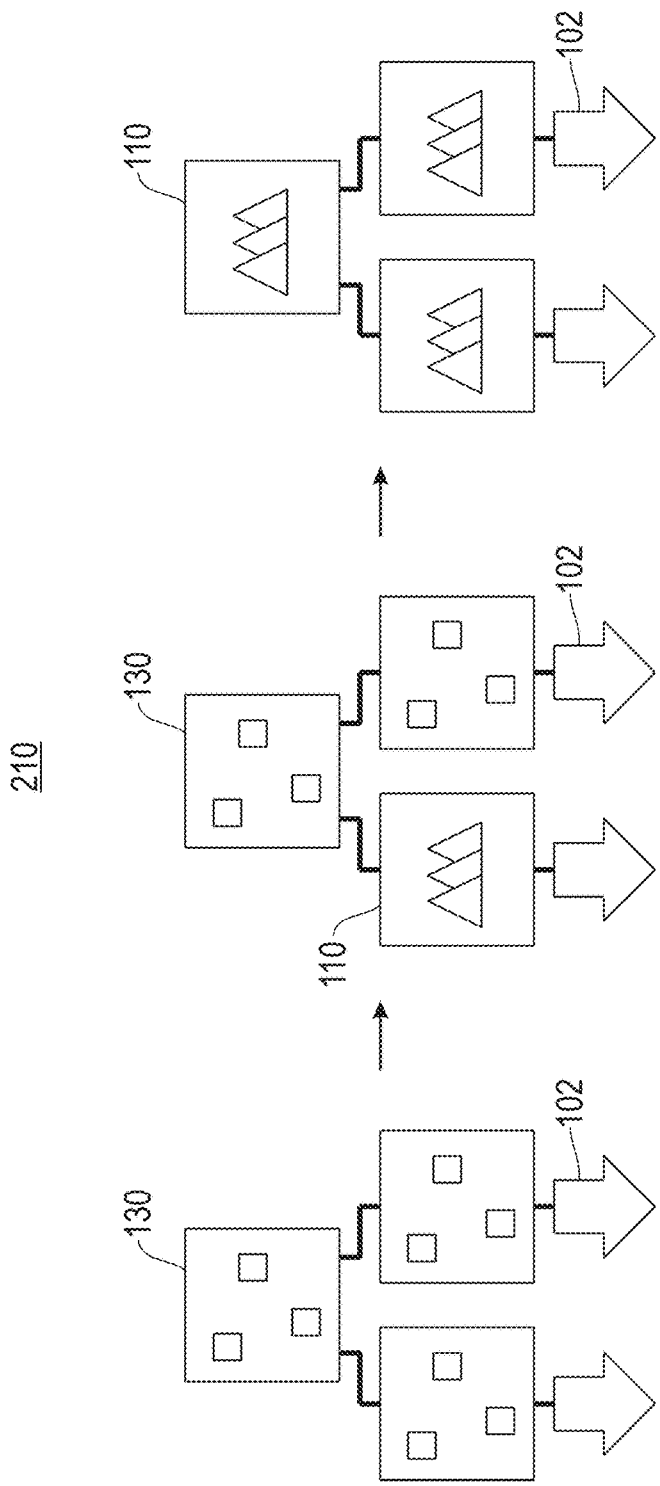
FIG. 13 illustrates an example wiring of circuit nodes, in accordance with an embodiment of the invention.

FIG. 13 illustrates an example wiring of circuit nodes 130, in accordance with an embodiment of the invention. Circuit nodes 130 may be wired as passthroughs by connecting its input ports 101 directly to its output ports 102 to facilitate rapid dataflow prototyping, thereby allowing a developer to sketch out a dataflow graph first and fill in nodes 50 later. By encapsulating subgraphs, circuit nodes 130 promote brainlet reuse in different networks.

A neuron node 110 may be generalized to cover any type of platform-specific node. For example, a neuron node 110 may be generalized to implement a general-purpose graphics-programming-unit (GPGPU) instruction set that is specific to a particular vendor's hardware platform. Execution of an algorithm may be distributed across hybrid computing architectures by targeting each component platform with a platform-specific node. Platform-specific nodes may be connected together using script nodes 120 and circuit nodes 130 that are platform independent.

Any arbitrary algorithm may be implemented within a brainlet framework at some level of performance optimization. In one embodiment, where no optimization is possible, an entire algorithm may be implemented as a monolithic script node 120. In another embodiment, where no global optimization is feasible, an algorithm may be partitioned into a dataflow graph whose individual nodes 50 may be accelerated by targeting specific platforms.

An external implementation of an algorithm may be imported into a brainlet 100 by wrapping its code in a script node 120. For example, a probabilistic graphical model may be represented as a brainlet 100 of script nodes 120. As another example, a Hidden Markov Model transition matrix may map directly to an adjacency matrix of a neuron node 110.

A TrueNorth-compatible brainlet may relax a constraint only if there is a reasonably efficient way to map its full range to a TrueNorth-compliant representation. For example, a corelet can represent arbitrary weight precisions subject to a hardware-specific design rule of limiting 4 axon types per core. In one embodiment, a TrueNorth-compatible brainlet 100 may relax constraints on core size and weight precision only. In another embodiment, a TrueNorth-compatible brainlet 100 may relax other constraints apart from core size and weight precision.

Figure 14:
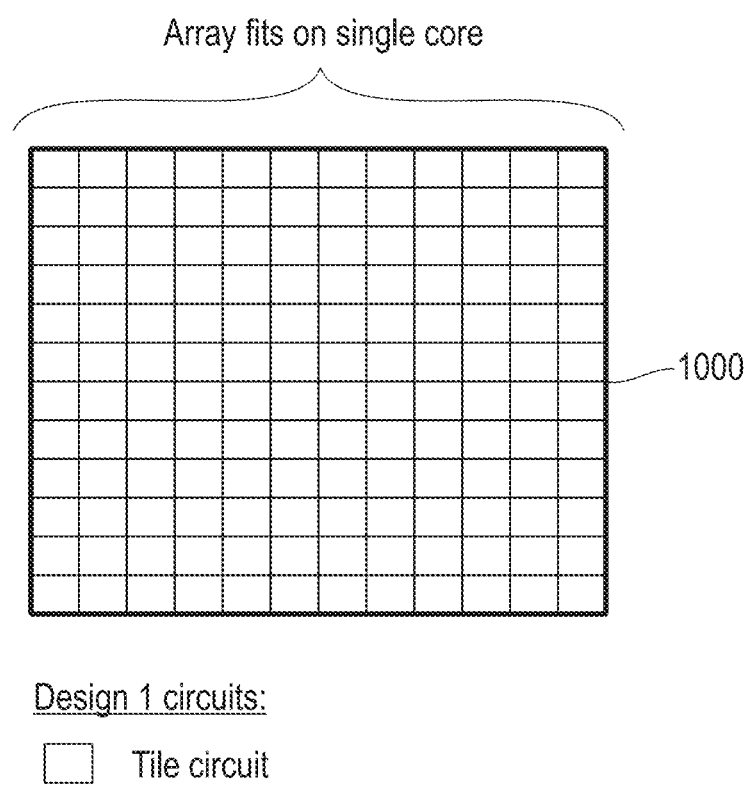
FIG. 14 illustrates an example TrueNorth core, in accordance with an embodiment of the invention.

FIG. 14 illustrates an example TrueNorth core 1000, in accordance with an embodiment of the invention. In one embodiment, an array fits into a single core 1000. This is an example in which instances of the same circuit may be tiled to form an array in which adjacent tiles communicate. The core 1000 is the same as the core circuit in FIG. 1. If all of the array's tiles can fit into a single core (i.e., uses a maximum of 256 neurons, in the current TrueNorth hardware), then only one tile circuit needs to be designed. However, if the array must be split across several cores (i.e., more than 256 neurons total), then the designer must create separate tiles for each boundary condition (FIG. 15).

FIG. 15 illustrates an example two-dimensional array of core circuits 10, in accordance with an embodiment of the invention. In one embodiment, an array is split across multiple cores 1000. Neurons 11 are arranged into cores 1000, wherein each core 1000 comprises up to 256 neurons 11. Each core 1000 has a fixed number of axons 15 for receiving input. Spikes arriving on axons 15 are routed through a crossbar 12, representing an explicit adjacency matrix, to efficiently multicast the spikes to any or all neurons 11 in the core 1000. Each neuron 11 is assigned a corresponding output channel that may connect to an axon 15 on at most one other core 1000. If a neuron 11 needs to send spikes to more than one other core 1000, a splitter circuit may be used to replicate and transmit the spikes on a separate output channel for every target core 1000.

When a function is partitioned across multiple cores 1000, a developer must stitch together boundary conditions. For example, consider an algorithm defined by a homogeneous array of tiles, each of which collects input from its nearest neighbors. If an array is too large to fit in the same TrueNorth core 1000, multiple splitter circuits may be used to distribute spikes to neighbors on adjacent cores 1000 (e.g., one splitter circuit for every boundary condition). If the array is also too large to fit in a single TrueNorth chip, additional circuits may be used to handle the chip-to-chip latencies. Networks requiring larger cores can be converted to TrueNorth-compliant representations using a network quantization algorithm.

TrueNorth currently allows up to 4 distinct weight values per core. The same weight is assigned to all crossbar connections receiving input from the same axon type, and there can be up to 4 different axon types per core. If a neuron 11 wants to transmit the same spike using different weights for different neurons 11 in the same core, it must have access to a different axon type for every weight. This limits weight dynamic range to 4 levels per core. Networks requiring higher precision weights can be converted to TrueNorth-compliant representations using a graph corelet algorithm.

A network quantization algorithm guarantees that any flat adjacency matrix can be compiled into corelets. Any True- North-compatible brainlet may be represented as a flat adjacency matrix. One example mapping is to first concatenate local adjacency matrices for all neuron nodes into one block-diagonal matrix, then fill in the off-diagonal elements specified by the node-to-node connections.

Rows and columns in the flat adjacency matrix may be reordered to cluster shared parameters into blocks that can fit into a single core. This transformation may be performed either top-down (i.e., flattening and clustering the global adjacency matrix for the entire brainlet) or bottom-up (i.e., clustering and merging the local adjacency matrices for individual graph nodes).

Figure 16:
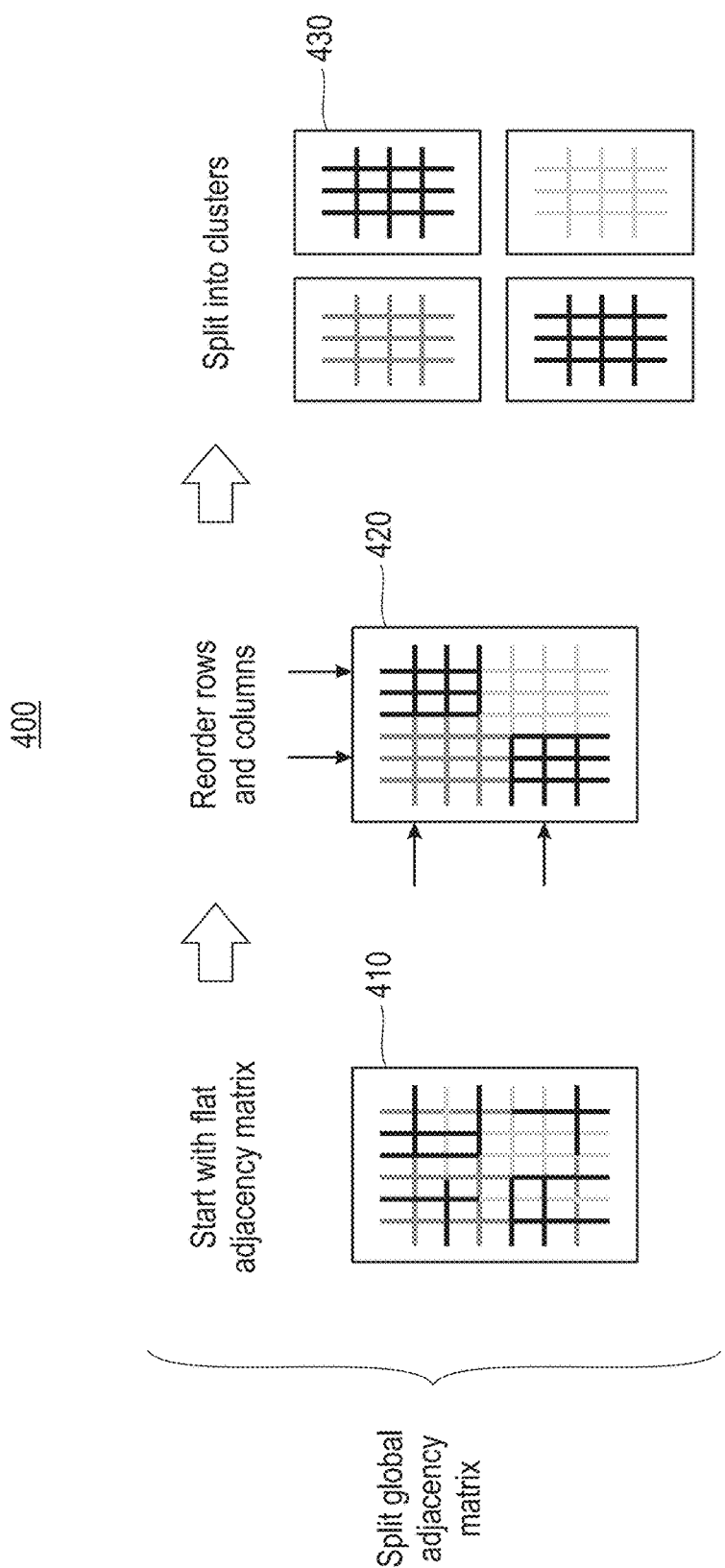
FIG. 16 illustrates an example top-down clustering method, in accordance with an embodiment of the invention.

FIG. 16 illustrates an example top-down clustering method 400, in accordance with an embodiment of the invention. In one embodiment, a global adjacency matrix 410 is reordered, and the reordered matrix 420 is split into clusters 430. This clustering method may be slow or memory-limited for larger networks.

Figure 17:
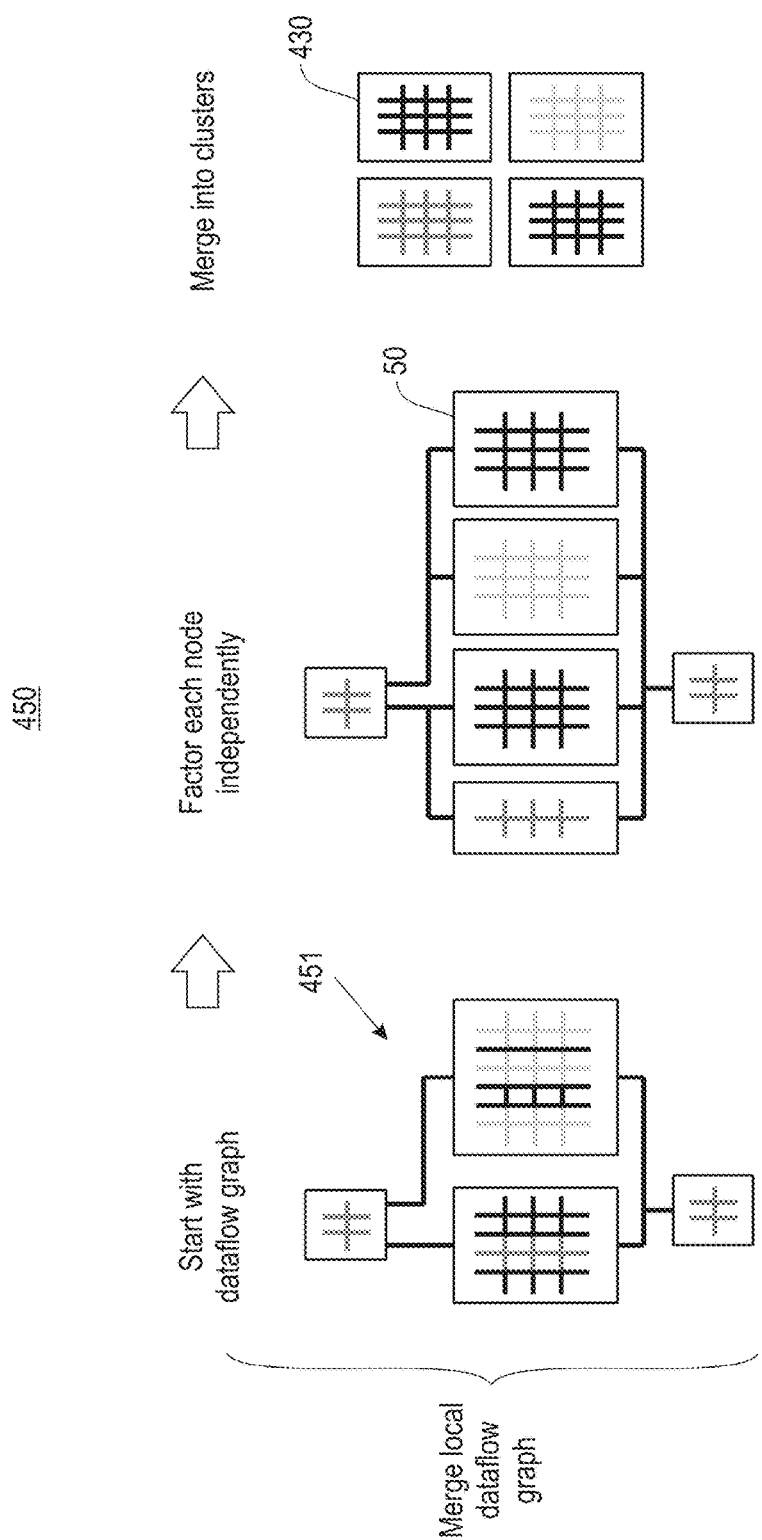
FIG. 17 illustrates an example bottom-up clustering method, in accordance with an embodiment of the invention.

FIG. 17 illustrates an example bottom-up clustering method 450, in accordance with an embodiment of the invention. A local partition may be obtained by first clustering a local adjacency matrix 451 for each node 50 independently, then merging node clusters 430.

In addition to requiring less memory, this bottom-up approach exploits dataflow graph topology to harvest semantic hints about shared parameters. Locality of code suggests locality of data (e.g., neurons in the same node are often arrays with the same parameter values).

A corelet compiler may run both local and global clusterings successively, and use the merged local clusters to improve the convergence of the global clustering by initializing it at a better initial condition.

Figure 18:
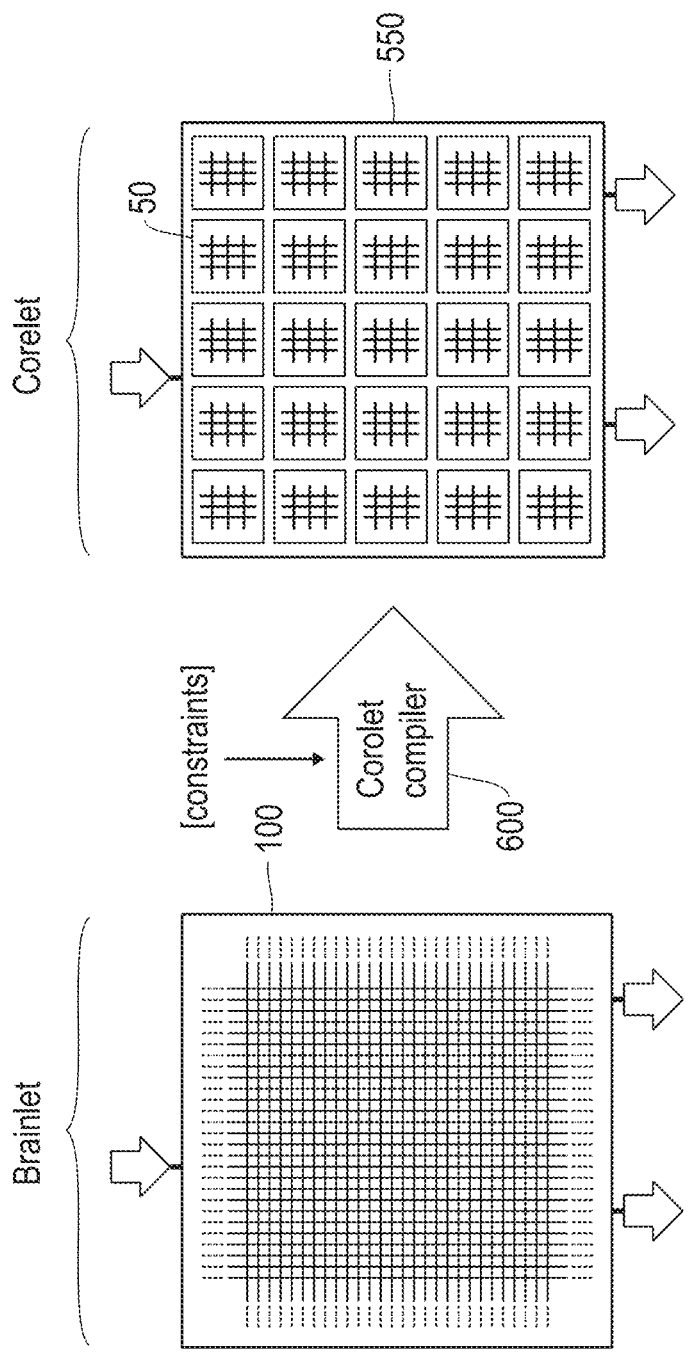
FIG. 18 illustrates an example corelet compiler, in accordance with an embodiment of the invention.

FIG. 18 illustrates an example corelet compiler 600, in accordance with an embodiment of the invention. The corelet compiler 600 guarantees that, given unlimited resources, it will transform every TrueNorth-compatible brainlet 100 into a corelet 550. The compiler 600 imports hardware constraints from a device-specific configuration file. A brainlet 100 can be targeted to a new TrueNorth device simply by recompiling with another configuration file. Given a set of hardware constraints, a developer can query the compiler 600 for the resources required to implement the brainlet 100. For example, the developer might ask the compiler 600 how many cores 10 the brainlet 100 needs when the configuration file imposes a maximum of 4 axon types per core. The developer can impose a ceiling on available resources and ask the compiler 600 to return an error if it cannot produce a corelet within the specified budget.

By compiling and simulating the same brainlet 100 using a range of artificial configuration files, the developer can sweep individual constraints to quantify their impact on algorithm performance. For example, the developer could measure the performance of a support vector machine brainlet 100 when weight precision is reduced to 8 bits, 4 bits, 2 bits, and 1 bit. The developer must simultaneously balance hardware-derived resource constraints with task-derived performance constraints. For example, a support vector machine brainlet might need high enough weight precision for the algorithm to be able to classify images accurately, but low enough weight precision to be implementable on an economically feasible number of TrueNorth chips. Many standard machine learning algorithms become very brittle when discretized too far, so it is important to profile their performance as a function of weight precision, network size, and other resource-constrained dimensions. If an algorithm's performance degrades too rapidly along any dimension, another approach may be explored.

Figure 19:
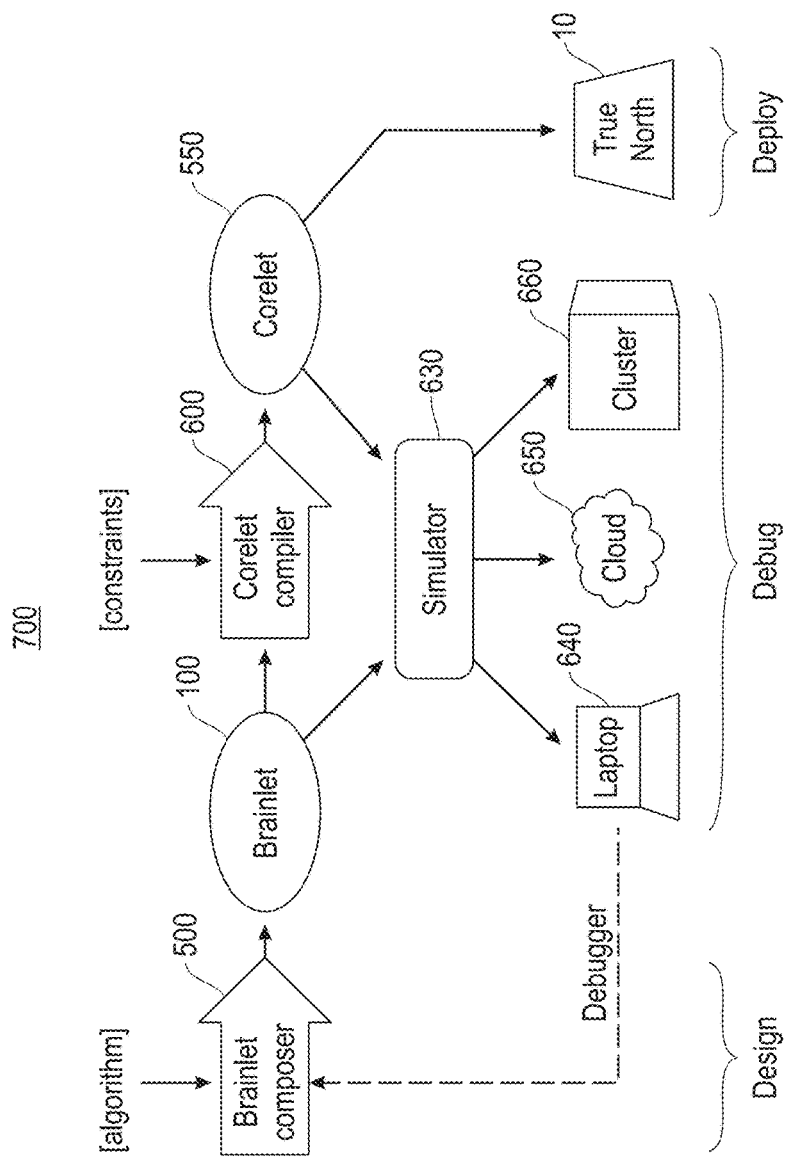
FIG. 19 illustrates an example brainlet system, in accordance with an embodiment of the invention.

FIG. 19 illustrates an example brainlet system 700, in accordance with an embodiment of the invention. The system 700 comprises a composer 500 for composing a brainlet 100. The system 700 further comprises a compiler 600 for compiling the brainlet 100 into a corelet 550 for mapping onto hardware (e.g., a TrueNorth core 1000). The system 700 further comprises a simulator 630 for simulating the brainlet 100. The simulator 630 may execute on a mobile computing device 640 (e.g., a laptop), a computing cloud 650 or a network cluster 660.

In one embodiment, each node 50 has an internal implementation that targets a specific execution engine, but different nodes can target different execution engines. For example, a brainlet 100 may process an image by first applying a script implementation of a rotation matrix and then smoothing the rotated image with a neuron implementation of a Gaussian filter.

In one embodiment, each node 50 optionally may support multiple implementations, in which case a developer can choose which one to execute. For example, a brainlet 100 for multiplying an input vector by a trinary weight matrix may define both a script implementation and a neuron implementation. The script implementation would represent weights as a sparse matrix of signed integers that is multiplied with an input vector using a fast numerical math package on a conventional processor. The neuron implementation would represent weights as crossbars and axon types and perform multiplication by iterating the neuron model equations to compute spike-coded products using a board of TrueNorth chips.

Swapping implementations should be essentially transparent to the rest of the brainlet 100 (i.e., different implementations of the same node 50 must produce acceptably equivalent output). For example, assume a node 50 outputs an unsigned integer using a data format that sums all the spikes generated in a frame. As long as the implementations produce identical spike totals in each frame, the node 50 can release individual spikes at different times.

In one embodiment, the simulator 630 must be able to run both neurons and scripts in the same brainlet. The simulator 630 utilizes two complementary execution engines, one for neuron nodes 110 and one for script nodes 130. The neuron execution engine evaluates TrueNorth neuron model equations, subject to hardware-specific design rules. When all of the design rules are imposed, the neuron execution engine becomes a TrueNorth hardware emulator whose computed output is spike-for-spike identical to the actual output. The script execution engine is an interpreter built on a mainstream scripting language (e.g., Python, Lua, or MATLAB). Using a mainstream scripting language allows the interpreter to leverage existing conventional processor packages, such as Intel's Math Kernel Library, that are highly optimized for basic linear algebra operations like multiplying a weight matrix by an input vector. For large brainlets running on TrueNorth hardware, a neuron implementation typically will be faster than a script implementation running on a conventional processor, and the reverse is true if the neurons must be emulated in software. A developer can mix and match implementations for every node in the brainlet 100, or let the simulator 630 decide based on available computing resources.

In one embodiment, to save time, a developer can load a predefined compiler configuration to target a specific hardware environment. The compiler configuration automatically selects a default implementation for every node 50, which the developer can override as desired. For example, a hybrid CPU-TrueNorth environment might preselect the CPU implementation for all of the linear algebra nodes and the TrueNorth implementation for all of the image filter nodes. The developer could then debug a specific node by toggling between the CPU and TrueNorth implementations.

In one embodiment, to assist the compiler 600 in identifying an optimal hardware assignment, each node 50 declares a relative affinity for each hardware type given its menu of available node implementations. For example, a matrix multiplication node might declare a higher CPU affinity than TrueNorth affinity if it has a CPU implementation that invokes standard linear algebra libraries. Nodes 50 with implementations for only one type of hardware have zero affinity for other types of hardware. The compiler 600 ranks nodes 50 by affinity when suggesting hardware assignments. In an environment with one CPU and only one TrueNorth chip, the nodes 50 with the highest declared TrueNorth affinity or lowest CPU affinity would be assigned to the TrueNorth chip, and the CPU would take the rest. An environment with one CPU and 128 TrueNorth chips could assign more lower-affinity nodes 50 to TrueNorth. A developer may override these assignments as needed.

In one embodiment, if a matrix is known to compile into a functionally equivalent corelet, it should be possible to simulate the corelet 550 as a matrix instead of having to simulate its neurons. For many computations, neurons are not the most natural way to think about the data. For example, if the goal is simply to multiply an input vector by a matrix of 8-bit integers, it is easier to represent the data as an actual vector and matrix of 8-bit integers, than to embed the equivalent structures in arrays of spiking neurons that need many extraneous model parameters and spike-code conversions to store an equivalent description. If TrueNorth hardware is not available, emulating a neuron implemented matrix multiplication in the simulator 630 will always be slower than calling the optimized linear algebra routines in MATLAB.

Figure 20:
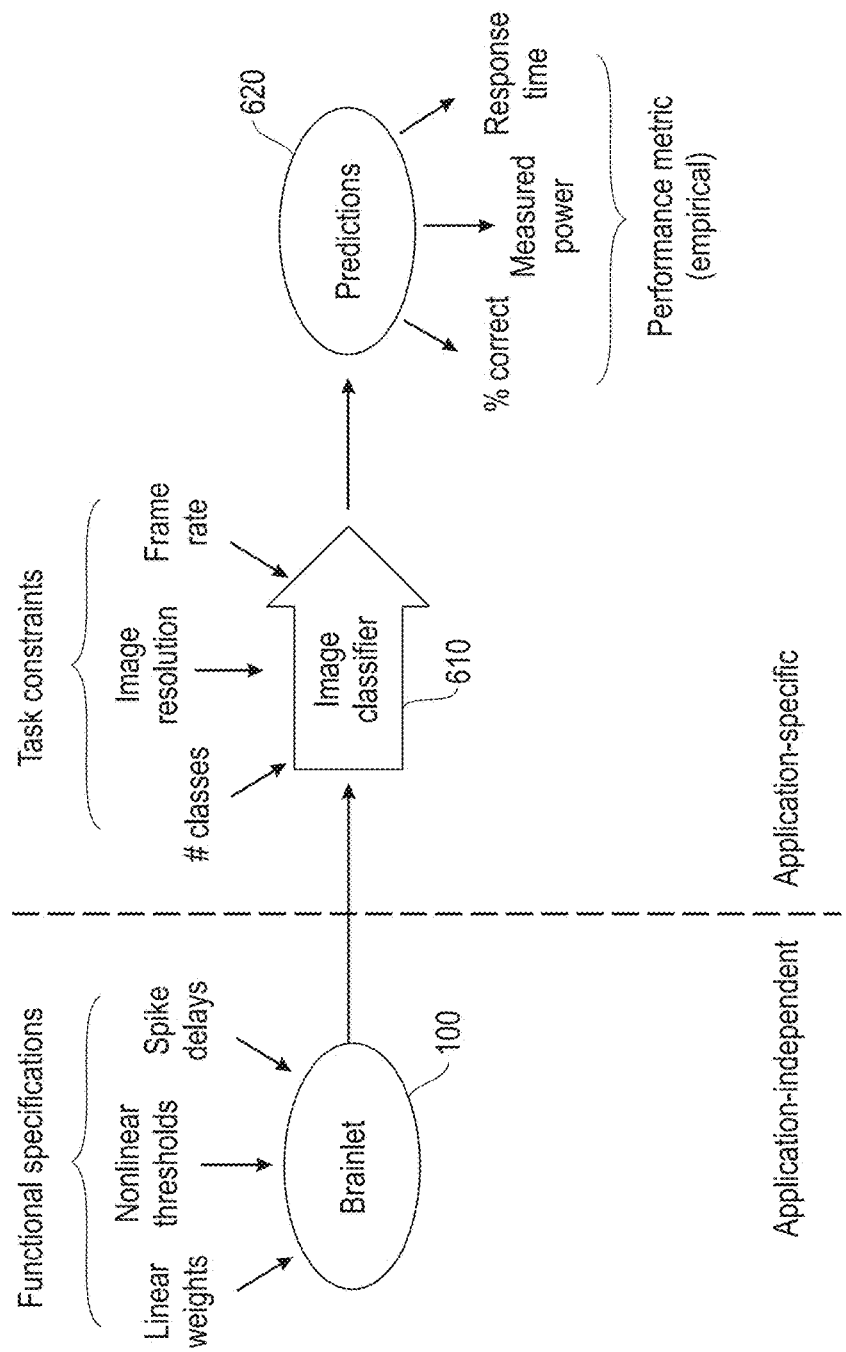
FIGS. 20-22 illustrate an example design flow, in accordance with an embodiment of the invention.
Figure 21:
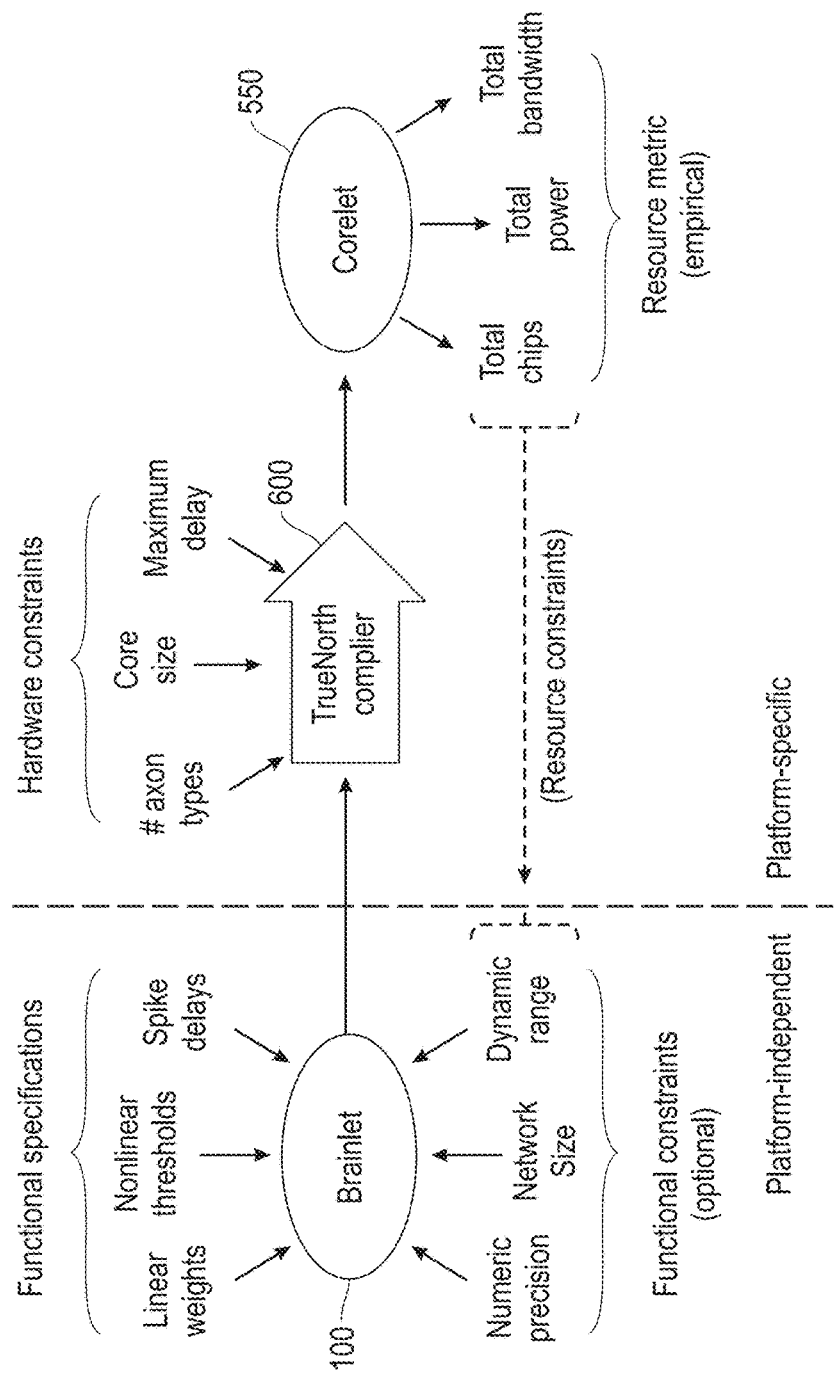
Figure 22:
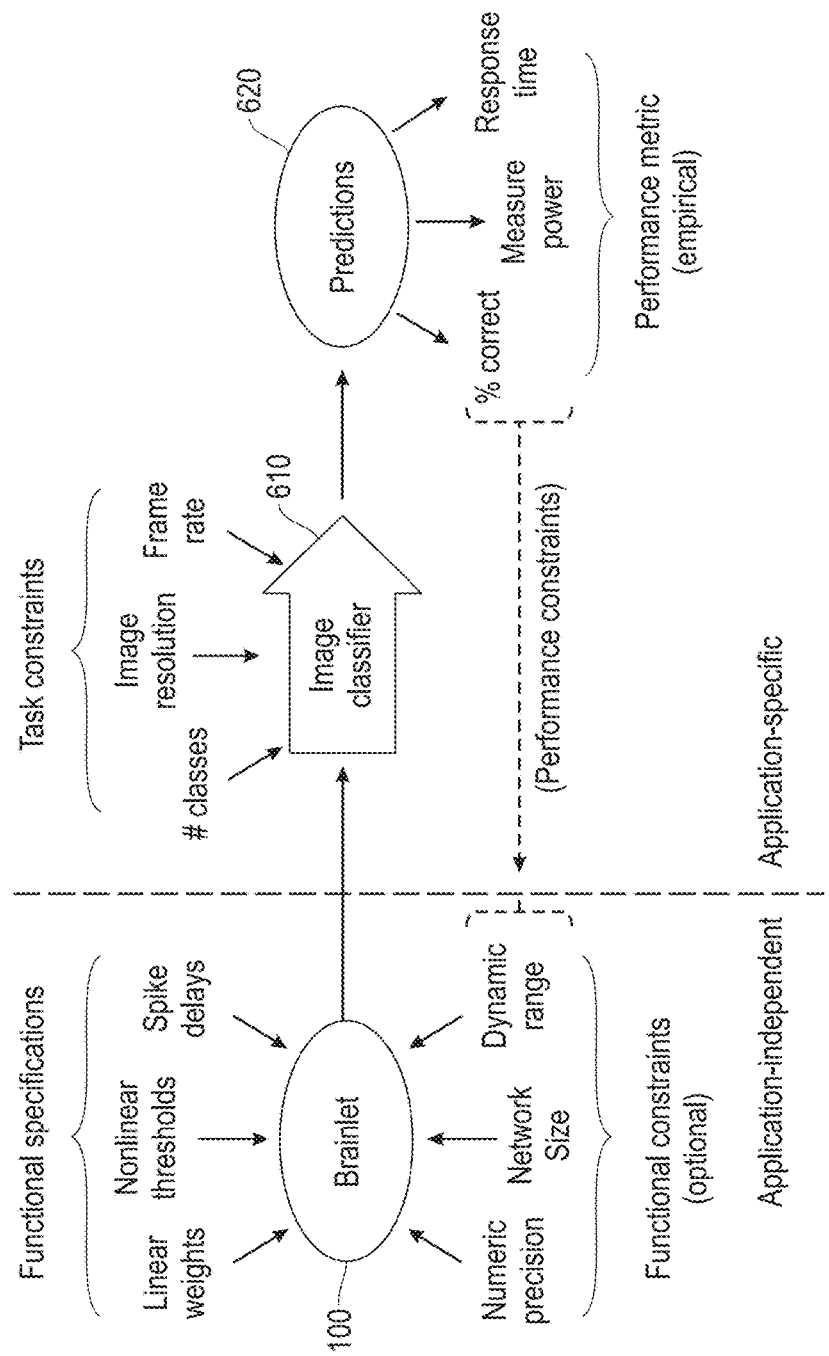

FIGS. 20-22 illustrate an example design flow, in accordance with an embodiment of the invention. A developer must simultaneously balance hardware-derived resource constraints with task-derived performance constraints. For example, in one embodiment, a support vector machine brainlet may require weight precision that is high enough for an image classifier 610 applying an algorithm to classify images accurately yet low enough to be implementable on an economically feasible number of TrueNorth chips.

For standard machine learning algorithms, weight precision, network size, and other resource-constrained dimensions must be taken into account. If an algorithm's performance degrades too rapidly along any dimension, another approach should be explored.

As shown in FIGS. 20-22, a developer may start with an unconstrained network and negotiate performance and resource constraints as needed. Specifically, the developer can begin by building an unconstrained brainlet that meets a particular performance target represented by a set 620 of one or more predictions; if the brainlet cannot achieve the performance target, find another algorithm until the performance target is met. The developer next queries the compiler to see if the brainlet fits within a resource budget. If not, the developer may tighten the brainlet constraints by reducing weight precision or network size to conform with available resources. If performance is too low, however, the brainlet constraints may be loosened by increasing weight precision or network size to meet the performance target. The developer repeats the above until an acceptable balance is found; if no acceptable balance can be found, the developer can either increase the resource budget or lower the performance target (if neither is possible, find another algorithm).

Figure 23A:
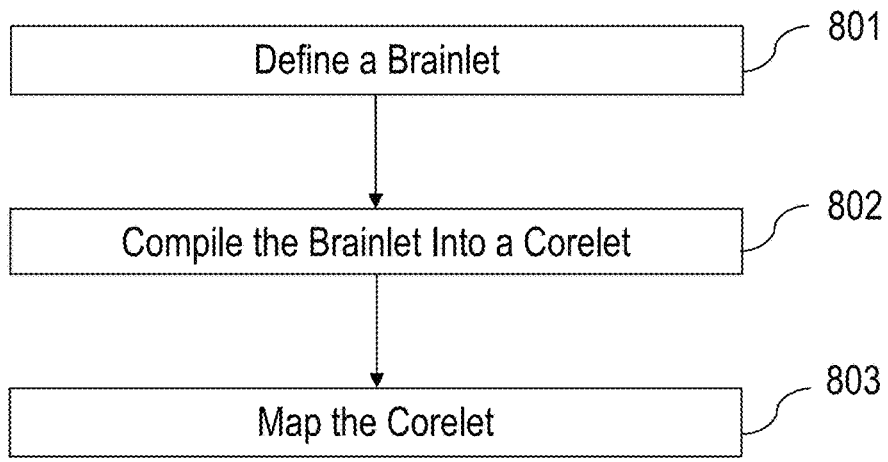
FIG. 23A illustrates a flowchart of an example process for mapping a substrate-compliant corelet, in accordance with an embodiment of the invention.

FIG. 23A illustrates a flowchart of an example process 800 for mapping a substrate-compliant corelet, in accordance with an embodiment of the invention. In process block 801, define a brainlet representing a platform-agnostic network of neurons, synapses, and axons. In process block 802, compile the brainlet into a corelet for mapping onto a neurosynaptic substrate, wherein the corelet is compatible with one or more conditions related to the neurosynaptic substrate. In process block 803, map the corelet onto the neurosynaptic substrate.

Figure 23B:
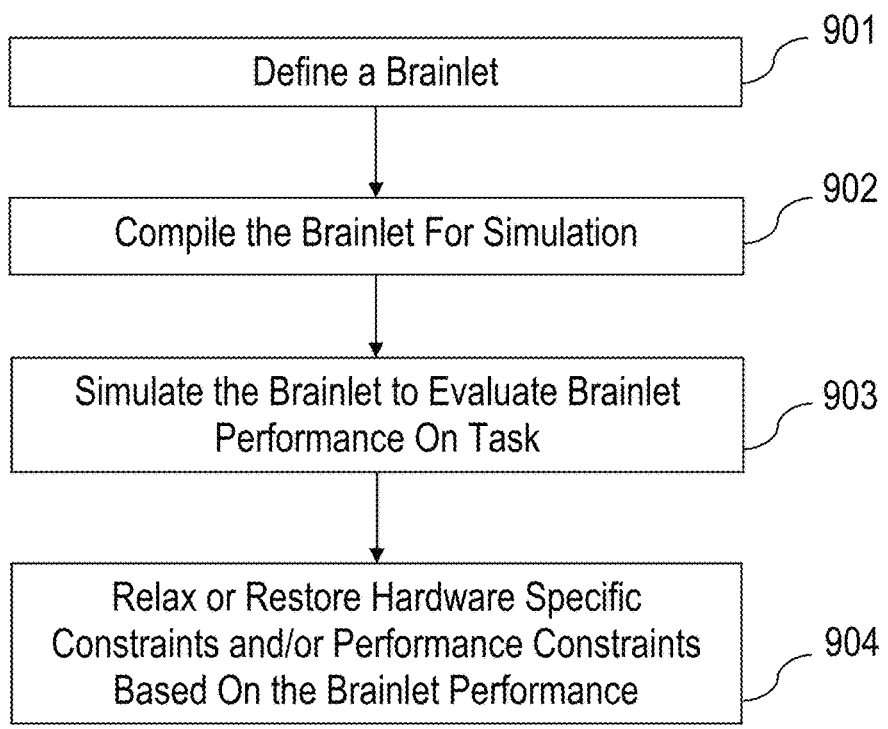
FIG. 23B illustrates a flowchart of an example process for constraining a brainlet, in accordance with an embodiment of the invention.

FIG. 23B illustrates a flowchart of an example process 900 for constraining a brainlet, in accordance with an embodiment of the invention. In process block 901, define a brainlet representing a platform-agnostic network of neurons, synapses, and axons. In process block 902, compile the brainlet for simulation. In process block 903, simulate the brainlet to evaluate brainlet performance on task. In process block 904, relax or restore one or more hardware specific constraints and/or performance constraints based on the brainlet performance.

Figure 24:
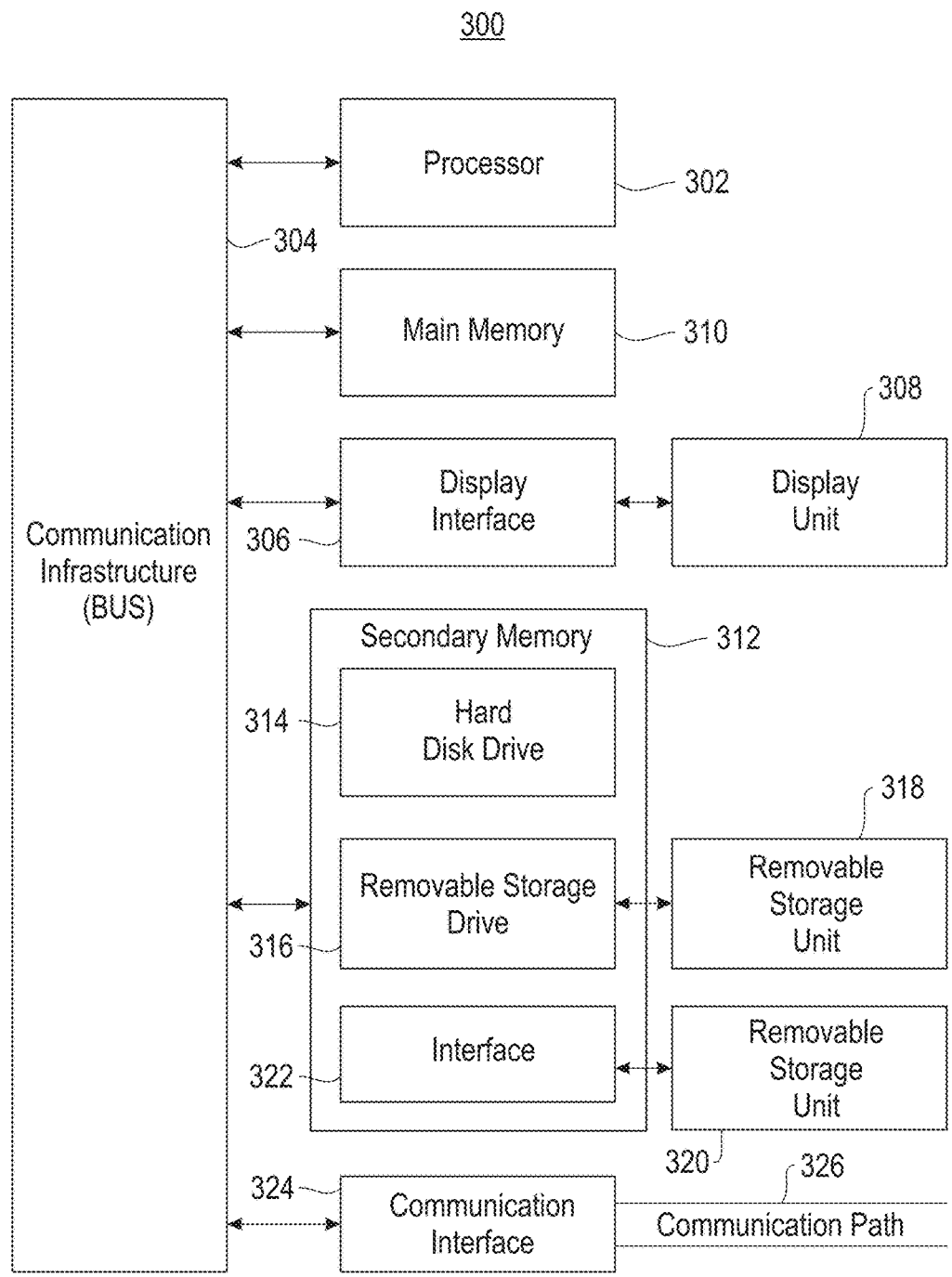
FIG. 24 is a high level block diagram showing an information processing system useful for implementing one embodiment of the present invention.

FIG. 24 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
defining a first software abstraction representing a neural network of neurons, synapses, and axons, wherein the first software abstraction comprises an imperative program for an algorithm;
compiling the first software abstraction into a second software abstraction for mapping onto a neurosynaptic hardware, wherein the second software abstraction is compatible with one or more conditions related to the neurosynaptic hardware, the conditions comprises at least one of a hardware-specific constraint related to the neurosynaptic hardware and a performance constraint, and the second software abstraction comprises a hardware-specific program for the algorithm; and
mapping the second software abstraction onto the neurosynaptic hardware, such that the neurosynaptic hardware simulates the neural network based on the algorithm.

2. The method of claim 1, further comprising:
compiling the first software abstraction for simulation; and
simulating the first software abstraction to evaluate performance on task.

3. The method of claim 2, further comprising:
relaxing one or more of the conditions based on the performance;
re-compiling the first software abstraction for simulation; and
re-simulating the first software abstraction to re-evaluate performance on task.

4. The method of claim 2, further comprising:
restoring one or more of the conditions based on the performance;
re-compiling the first software abstraction for simulation; and
re-simulating the first software abstraction to re-evaluate performance on task.

5. The method of claim 2, further comprising:
running one or more portions of the first software abstraction on different execution engines.

6. The method of claim 1, wherein the neurosynaptic hardware comprises one or more interconnected cores, and each core comprises a plurality of electronic neurons, a plurality of electronic axons, and a plurality of synapses interconnecting the neurons to the axons.

7. The method of claim 2, wherein:
the first software abstraction is constrained based on the conditions.

8. The method of claim 7, further comprising:
trading one or more hardware-specific constraints related to the neurosynaptic hardware with one or more performance constraints;
re-compiling the first software abstraction for simulation; and
re-simulating the first software abstraction to re-evaluate performance on task.

9. A system, comprising:
at least one processor; and
a non-transitory processor-readable memory device storing instructions that when executed by the at least one processor causes the at least one processor to perform operations including:
defining a first software abstraction representing a neural network of neurons, synapses, and axons, wherein the first software abstraction comprises an imperative program for an algorithm;
compiling the first software abstraction into a second software abstraction for mapping onto a neurosynaptic hardware, wherein the second software abstraction is compatible with one or more conditions related to the neurosynaptic hardware, the conditions comprises at least one of a hardware-specific constraint related to the neurosynaptic hardware and a performance constraint, and the second software abstraction comprises a hardware-specific program for the algorithm; and
mapping the second software abstraction onto the neurosynaptic hardware, such that the neurosynaptic hardware simulates the neural network based on the algorithm.

10. The system of claim 9, wherein the operations further include:
compiling the first software abstraction for simulation; and
simulating the first software abstraction to evaluate performance on task.

11. The system of claim 10, wherein the operations further include:
relaxing one or more of the conditions based on the performance;
re-compiling the first software abstraction for simulation; and
re-simulating the first software abstraction to re-evaluate performance on task.

12. The system of claim 10, wherein the operations further include:
restoring one or more of the conditions based on the performance;
re-compiling the first software abstraction for simulation; and
re-simulating the first software abstraction to re-evaluate performance on task.

13. The system of claim 10, wherein the operations further include:
running one or more portions of the first software abstraction on different execution engines.

14. The system of claim 10, wherein the neurosynaptic hardware comprises one or more interconnected cores, and each core comprises a plurality of electronic neurons, a plurality of electronic axons, and a plurality of synapses interconnecting the neurons to the axons.

15. The system of claim 10, wherein:
the first software abstraction is constrained based on the conditions.

16. The system of claim 15, wherein the operations further include:
  trading one or more hardware-specific constraints related to the neurosynaptic hardware with one or more performance constraints;
  re-compiling the first software abstraction for simulation; and
  re-simulating the first software abstraction to re-evaluate performance on task.

17. The system of claim 9, wherein the first software abstraction is
  defined via one of the following programming interfaces: a text editor, or a visual programmer.

18. The system of claim 9, wherein the system is an integrated development environment.

19. The system of claim 9, wherein one or more portions of the first software abstraction may run on different platforms.

20. A non-transitory computer program product, the computer program product comprising a computer-readable storage medium having program code embodied therewith, the program code being executable by a computer to:
  define a first software abstraction representing a neural network of neurons, synapses, and axons, wherein the first software abstraction comprises an imperative program for an algorithm;
  compile the first software abstraction into a second software abstraction for mapping onto a neurosynaptic hardware, wherein the second software abstraction is compatible with one or more conditions related to the neurosynaptic hardware, the conditions comprises at least one of a hardware-specific constraint related to the neurosynaptic hardware and a performance constraint, and the second software abstraction comprises a hardware-specific program for the algorithm; and
  map the second software abstraction onto the neurosynaptic hardware, such that the neurosynaptic hardware simulates the neural network based on the algorithm.

* * * * *